United States Patent
Matsumura et al.

(10) Patent No.: US 9,976,083 B2
(45) Date of Patent: *May 22, 2018

(54) LIQUID CRYSTAL DISPLAY DEVICE AND LIQUID CRYSTAL COMPOSITION

(71) Applicants: JNC CORPORATION, Tokyo (JP); JNC PETROCHEMICAL CORPORATION, Tokyo (JP)

(72) Inventors: Yoshinari Matsumura, Chiba (JP); Masayuki Saito, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/127,409

(22) PCT Filed: Feb. 13, 2015

(86) PCT No.: PCT/JP2015/053984
§ 371 (c)(1),
(2) Date: Sep. 19, 2016

(87) PCT Pub. No.: WO2015/151607
PCT Pub. Date: Oct. 8, 2015

(65) Prior Publication Data
US 2017/0130128 A1    May 11, 2017

(30) Foreign Application Priority Data
Mar. 31, 2014 (JP) ................................. 2014-072180

(51) Int. Cl.
| G02F 1/1333 | (2006.01) |
| C09K 19/34 | (2006.01) |
| C09K 19/02 | (2006.01) |
| G02F 1/1362 | (2006.01) |
| C09K 19/04 | (2006.01) |

(52) U.S. Cl.
CPC ...... *C09K 19/3402* (2013.01); *C09K 19/0208* (2013.01); *C09K 19/0216* (2013.01); *G02F 1/1362* (2013.01); *C09K 2019/0466* (2013.01); *C09K 2019/3422* (2013.01)

(58) Field of Classification Search
CPC ............ C09K 19/3402; C09K 19/0208; C09K 19/0216; C09K 2019/3422; C09K 2019/0466; G02F 1/1333; G02F 1/1362

USPC .............. 252/299.01, 299.6, 299.66; 428/1.1
See application file for complete search history.

(56) References Cited

U.S. PATENT DOCUMENTS

| 2012/0069275 | A1 | 3/2012 | Saito | |
| 2015/0225647 | A1 | 8/2015 | Furusato et al. | |
| 2017/0015905 | A1* | 1/2017 | Matsumura | ............ C09K 19/12 |
| 2017/0114277 | A1* | 4/2017 | Furusato | ............ C09K 19/3066 |

FOREIGN PATENT DOCUMENTS

| JP | H02-064525 | 3/1990 |
| JP | 2008134291 | 6/2008 |
| WO | 2010131594 | 11/2010 |
| WO | 2014045905 | 3/2014 |

OTHER PUBLICATIONS

"International Search Report (Form PCT/ISA/210) of PCT/JP2015/053984", dated May 19, 2015, with English translation thereof, pp. 1-4.

* cited by examiner

*Primary Examiner* — Geraldina Visconti
(74) *Attorney, Agent, or Firm* — JCIPRNET

(57) ABSTRACT

The subject is to show a liquid crystal display device having characteristics such as a short response time, a large voltage holding ratio, a low threshold voltage, a large contrast ratio, a long service life and a small flicker rate. The means concerns a liquid crystal display device including a first substrate, a second substrate and a liquid crystal composition having positive dielectric anisotropy, which is placed between these substrates, wherein the liquid crystal composition has a nematic phase and includes at least one compound selected from the group of compounds represented by formula (1) as a first component:

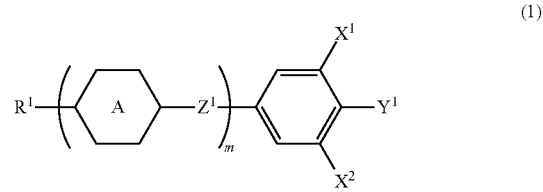

(1)

in formula (1), $R^1$ is alkyl or the like; ring A is 1,4-phenylene or the like; $Z^1$ is a single bond or the like; $X^1$ and $X^2$ is hydrogen or fluorine; $Y^1$ is fluorine or the like; and m is 0, 1, 2, 3 or 4.

12 Claims, No Drawings

LIQUID CRYSTAL DISPLAY DEVICE AND LIQUID CRYSTAL COMPOSITION

CROSS-REFERENCE TO RELATED APPLICATION

This application is a 371 application of the international PCT application serial no. PCT/JP2015/053984, filed on Feb. 13, 2015, which claims the priority benefit of Japan application no. 2014-072180, filed on Mar. 31, 2014. The entirety of each of the abovementioned patent applications is hereby incorporated by reference herein and made a part of this specification.

TECHNICAL FIELD

The invention relates to a liquid crystal composition, a liquid crystal display device including this composition and so forth. It relates especially to a liquid crystal composition having positive dielectric anisotropy and an AM (active matrix) device including this composition and having a mode of TN, OCB, IPS, FFS or FPA.

TECHNICAL BACKGROUND

In a liquid crystal display device, a classification based on an operating mode for liquid crystal molecules includes modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). A classification based on a driving mode in the device includes PM (passive matrix) and AM (active matrix). The PM is classified into static, multiplex and so forth, and the AM is classified into TFT (thin film transistor), MIM (metal-insulator-metal) and so forth. The TFT is classified into amorphous silicon and polycrystal silicon. The latter is classified into a high temperature type and a low temperature type depending on the production process. A classification based on a light source includes a reflection type utilizing natural light, a transmission type utilizing a backlight and a semi-transmission type utilizing both natural light and a backlight.

The liquid crystal display device includes a liquid crystal composition having a nematic phase. This composition has suitable characteristics. An AM device having good characteristics can be obtained by improving the characteristics of this composition. Table 1 below summarizes the relationship between these two characteristics. The characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Response time that is one millisecond shorter than that of the other devices is desirable. Thus a small viscosity of the composition is desirable. A small viscosity at a low temperature is more desirable. The elastic constant of the composition relates to the contrast ratio of the device. A large elastic constant of the composition is desirable for increasing the contrast ratio of the device.

TABLE 1

Characteristics of Compositions and AM Devices

| No. | Characteristics of Compositions | Characteristics of AM Devices |
| --- | --- | --- |
| 1 | a wide temperature range of a nematic phase | a wide temperature range in which the device can be used |
| 2 | a small viscosity | a short response time |
| 3 | a suitable optical anisotropy | a large contrast ratio |
| 4 | a large positive or negative dielectric anisotropy | a low threshold voltage and low power consumption, a large contrast ratio |
| 5 | a large specific resistance | a large voltage holding ratio and a large contrast ratio |
| 6 | a high stability to ultraviolet light and heat | a long service life |
| 7 | a large elastic constant | a large contrast ratio and a short response time |

The optical anisotropy of the composition relates to the contrast ratio of the device. A large optical anisotropy or a small optical anisotropy, namely a suitable optical anisotropy, is necessary depending on the mode of the device. The product ($\Delta n \times d$) of the optical anisotropy ($\Delta n$) of the composition and the cell gap (d) of the device is designed so as to maximize the contrast ratio. A suitable value of the product depends on the type of operating mode. A suitable value is approximately 0.45 micrometer for a device having a mode such as TN. In this case, a composition having a large optical anisotropy is desirable for a device having a small cell gap. A large dielectric anisotropy of the composition contributes to a low threshold voltage, low power consumption and a large contrast ratio of the device. A large dielectric anisotropy is thus desirable.

A large specific resistance of the composition contributes to a large voltage holding ratio and a large contrast ratio of the device. It is thus desirable that a composition should have a large specific resistance at a temperature close to the maximum temperature of a nematic phase as well as at room temperature in the initial stages. It is desirable that a composition should have a large specific resistance at a temperature close to the maximum temperature of a nematic phase as well as at room temperature, after it has been used for a long time. The stability of the composition to ultraviolet light and heat relates to the service life of the device. The device has a long service life when the stability is high. These types of characteristics are desirable for an AM device used for a liquid crystal projector, a liquid crystal television and so forth.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a PSA (polymer sustained alignment) type. An example of the liquid crystal composition having positive dielectric anisotropy is disclosed in the following patent document No. 1.

A flicker sometimes is generated on a display screen when a liquid crystal display device is used for a long time. The flicker relates to image burn-in, and it is estimated that the flicker is caused by the difference between electric potential of the positive frame and the negative frame when the device is driven by an alternating current. An improvement has been tried in order to suppress the generation of the flicker in view of the structure of the device or the component of the composition.

PRIOR ART

Patent Document

Patent document No. 1: WO 2010-131594 A.

SUMMARY OF THE INVENTION

Subject to be Solved by the Invention

The invention provides a liquid crystal display device that has characteristics such as a short response time, a large voltage holding ratio, a low threshold voltage, a large contrast ratio, a long service life and a small flicker rate. The invention also provides a liquid crystal composition that is used for such a device. The invention further provides a liquid crystal composition that satisfies at least one of characteristics such as a high maximum temperature of a nematic phase, a low minimum temperature of a nematic phase, a small viscosity, a suitable optical anisotropy, a large positive dielectric anisotropy, a large specific resistance, a high stability to ultraviolet light, a high stability to heat and a large elastic constant. The invention yet further provides a liquid crystal composition that is suitably balanced between at least two of the characteristics.

Means for Solving the Subject

The invention relates to a liquid crystal display device including a first substrate and a second substrate and a liquid crystal composition having positive dielectric anisotropy, which is placed between these substrates, wherein a flicker rate of the liquid crystal display device is in the range of 0% to 1%, and to a liquid crystal composition included in the device and to a liquid crystal compound included the composition.

Effect of the Invention

One of the advantages of the invention is to provide a liquid crystal display device that has characteristics such as a short response time, a large voltage holding ratio, a low threshold voltage, a large contrast ratio, a long service life and a small flicker rate. Another advantage is to provide a liquid crystal composition that is used for such a device. A further advantage is to provide a liquid crystal composition that satisfies at least one of characteristics such as a high maximum temperature of a nematic phase, a low minimum temperature of a nematic phase, a small viscosity, a suitable optical anisotropy, a large positive dielectric anisotropy, a large specific resistance, a high stability to ultraviolet light, a high stability to heat and a large elastic constant. A further advantage is to provide a liquid crystal composition that is suitably balanced between at least two of the characteristics.

EMBODIMENT TO CARRY OUT THE INVENTION

The usage of the terms in the specification and claims is as follows. "Liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, and for a compound having no liquid crystal phases but being mixed to a composition for the purpose of adjusting the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it.

A liquid crystal composition is prepared by mixing a plurality of liquid crystal compounds. The proportion of a liquid crystal compound (content) is expressed as a percentage by weight (% by weight) based on the weight of this liquid crystal composition. An additive such as an optically active compound, an antioxidant, an ultraviolet light absorber, a coloring matter, an antifoaming agent, a polymerizable compound, a polymerization initiator and a polymerization inhibitor is added to this liquid crystal composition as required. The proportion of the additive (added amount) is expressed as a percentage by weight (% by weight) based on the weight of the liquid crystal composition in the same manner as with the liquid crystal compound. Weight parts per million (ppm) is sometimes used. The proportion of the polymerization initiator and the polymerization inhibitor is exceptionally expressed on the basis of the weight of the polymerizable compound.

"A higher limit of the temperature range of a nematic phase" is sometimes abbreviated to "the maximum temperature." "A lower limit of the temperature range of a nematic phase" is sometimes abbreviated to "the minimum temperature." That "specific resistance is large" means that a composition has a large specific resistance at a temperature close to the maximum temperature of a nematic phase as well as at room temperature in the initial stages, and that the composition has a large specific resistance at a temperature close to the maximum temperature of a nematic phase as well as at room temperature, after it has been used for a long time. That "a voltage holding ratio is large" means that a device has a large voltage holding ratio at a temperature close to the maximum temperature of a nematic phase as well as at room temperature in the initial stages, and that the device has a large voltage holding ratio at a temperature close to the maximum temperature of a nematic phase as well as at room temperature, after it has been used for a long time. The expression "increase the dielectric anisotropy" means that its value increases positively when the composition has positive dielectric anisotropy, and that its value increases negatively when the composition has negative dielectric anisotropy.

The expression "at least one 'A'" means that the number of 'A' is arbitrary. The expression "at least one 'A' may be replaced by 'B'" means that the position of 'A' is arbitrary when the number of 'A' is one, and the positions can also be selected without restriction when the number of 'A' is two or more. This rule also applies to the expression "at least one 'A' has been replaced by 'B'." For example, the expression, "in the alkyl, at least one —$CH_2$— may be replaced by —O— or —S—" includes groups such as —$OCH_3$, —$CH_2OCH_3$, —$CH_2OCH_2CH_2OCH_3$, —$SCH_2CH_2CH_3$, —$CH_2CH_2SCH_3$ and —$CH_2OCH_2CH_2SCH_3$. Incidentally, it is undesirable that two successive —$CH_2$— should be replaced by —O— to give —O—O—. It is also undesirable that —$CH_2$— of a methyl moiety (—$CH_2$—H) in alkyl and so forth should be replaced by —O— to give —O—H.

In formula (1) to (3), the symbol such as A, B or C surrounded by a hexagon corresponds to ring B or ring C, respectively. The hexagon represents a six-membered ring or a condensed ring. A compound represented by formula (1) is sometimes abbreviated to "compound (1)." At least one compound selected from the group of compounds represented by formula (1) is sometimes abbreviated to "compound (1)." "Compound (1)" means one compound, a mixture of two compounds or a mixture of three or more compounds represented by formula (1). This applies to a compound represented by another formula.

The symbol for the terminal group, $R^1$, is used for a plurality of compounds in the chemical formulas of component compounds. In these compounds, two groups represented by two arbitrary $R^1$ may be the same or different. In one case, for example, $R^1$ of compound (1-1) is ethyl and $R^1$ of compound (1-2) is ethyl. In another case, $R^1$ of compound (1-1) is ethyl and $R^1$ of compound (1-2) is propyl. The same rule applies to symbols such as $R^2$ and $Y^1$. In formula (1), two of ring A are present when m is 2. In this compound, two groups represented by two of ring A may be the same or different. The same rule applies to arbitrary two of ring A, when mm is greater than 2. The same rule also applies to symbols such as $Z^1$ and ring B.

2-Fluoro-1,4-phenylene means the two divalent groups described below. Fluorine may be facing left (L) or facing right (R) in a chemical formula. The same rule also applies to an asymmetric divalent group formed from a ring by removing two hydrogens, such as tetrahydropyran-2,5-diyl. The same rule also applies to a bonding group such as carbonyloxy (—COO— and —OCO—).

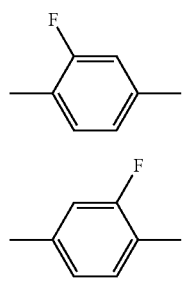

The invention includes the following items.

Item 1. A liquid crystal display device including a first substrate, a second substrate and a liquid crystal composition having a nematic phase and having positive dielectric anisotropy, which is placed between these substrates, wherein a flicker rate is in the range of 0% to 1%.

Item 2. The liquid crystal display device according item 1, wherein the liquid crystal composition includes at least one compound selected from the group of compounds represented by formula (1) as a first component:

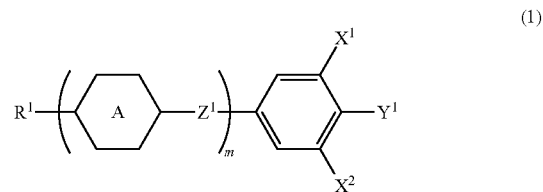

in formula (1), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyrimidine-2,5-diyl, 1,3-dioxane-2,5-diyl, tetrahydropyran-2,5-diyl or naphthalene-2,6-diyl; $Z^1$ is a single bond, ethylene, vinylene, methyleneoxy, carbonyloxy or difluoromethyleneoxy; $X^1$ and $X^2$ are independently hydrogen or fluorine; $Y^1$ is fluorine, chlorine, alkyl having 1 to 12 carbons in which at least one hydrogen has been replaced by halogen, alkoxy having 1 to 12 carbons in which at least one hydrogen has been replaced by halogen or alkenyloxy having 2 to 12 carbons in which at least one hydrogen has been replaced by halogen; m is 0, 1, 2, 3 or 4.

Item 3. The liquid crystal display device according item 2, wherein the first component of the liquid crystal composition is at least one compound selected from the group of compounds represented by formula (1-1) to formula (1-21):

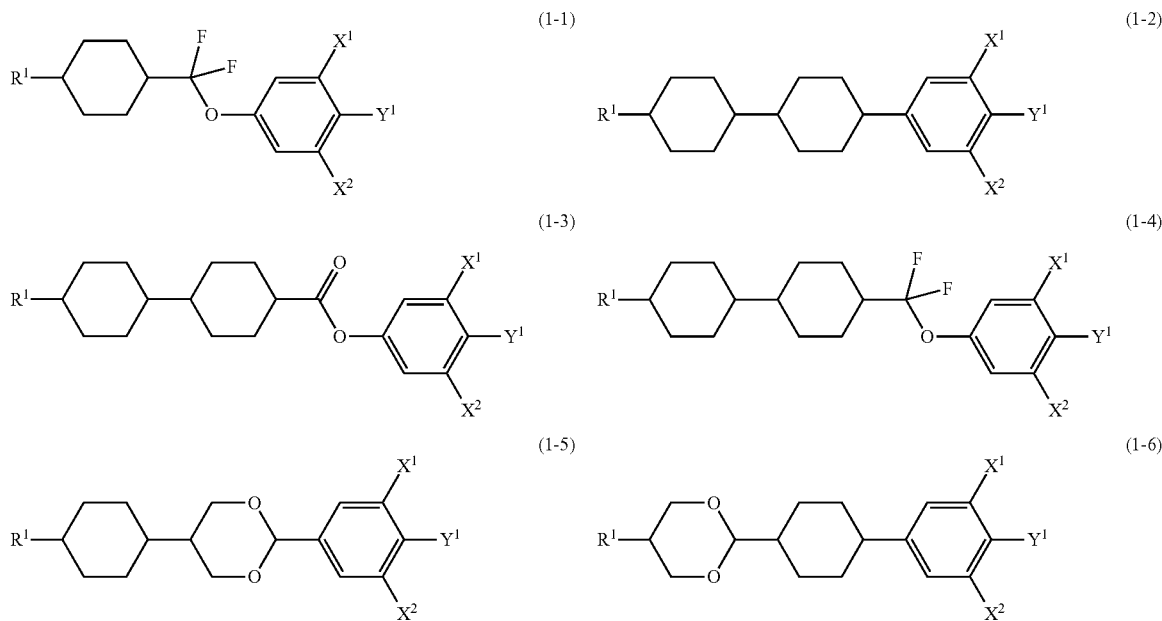

-continued
(1-7)
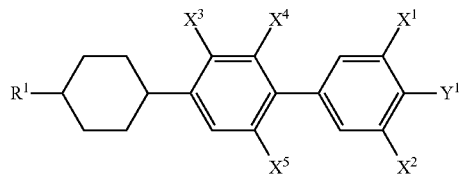
(1-8)
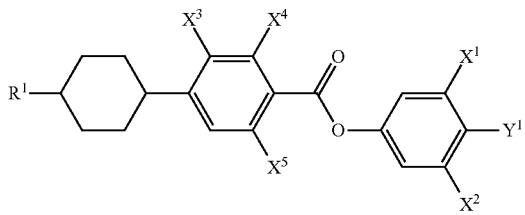
(1-9)
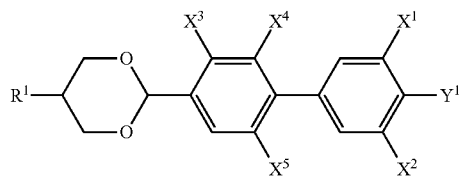
(1-10)
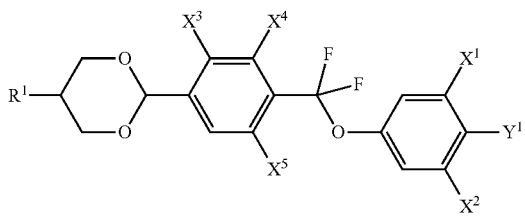
(1-11)
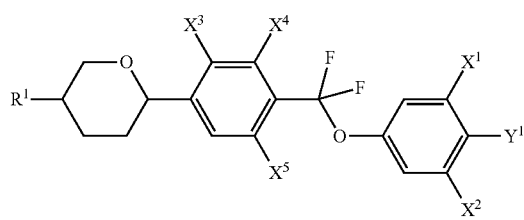
(1-12)
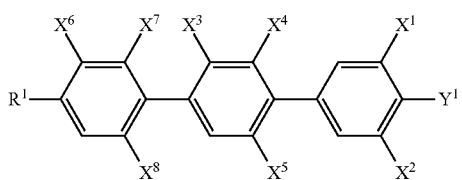
(1-13)
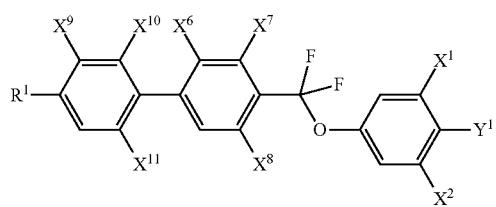
(1-14)
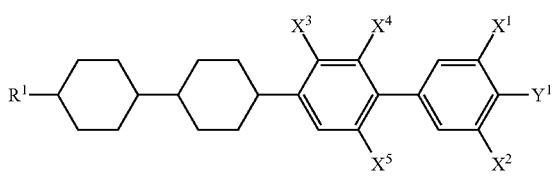
(1-15)
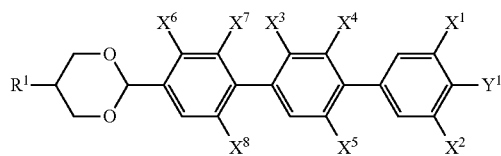
(1-16)
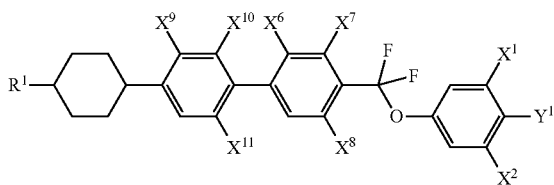
(1-17)
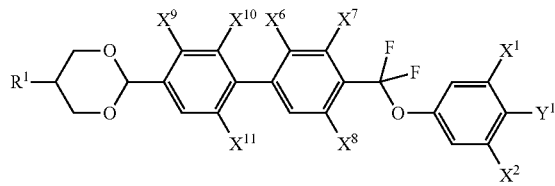
(1-18)
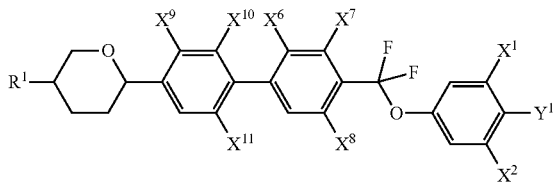
(1-19)
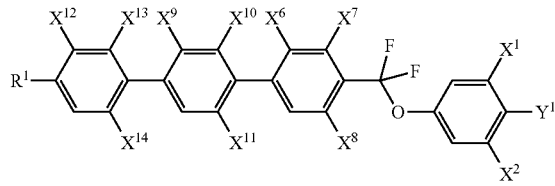
(1-20)
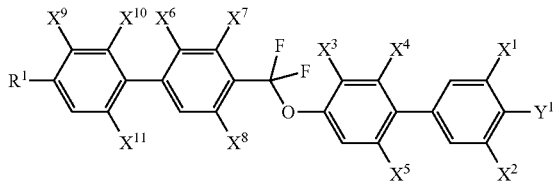

-continued

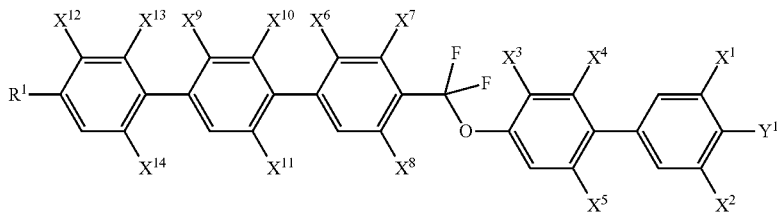
(1-21)

in formula (1-1) to formula (1-21), $R^1$ is alkyl having 1 to 12 carbons, alkoxy having 1 to 12 carbons or alkenyl having 2 to 12 carbons; $X^1$ to $X^{14}$ are independently hydrogen or fluorine; $Y^1$ is fluorine, chlorine, alkyl having 1 to 12 carbons in which at least one hydrogen has been replaced by halogen or alkoxy having 1 to 12 carbons in which at least one hydrogen has been replaced by halogen.

Item 4. The liquid crystal display device according to item 2 or 3, wherein the proportion of the first component of the liquid crystal composition is in the range of 15% by weight to 60% by weight based on the weight of the liquid crystal composition.

Item 5. The liquid crystal display device according to any one of items 1 to 4, wherein the liquid crystal composition includes at least one compound selected from the group of compounds represented by formula (2) as a second component:

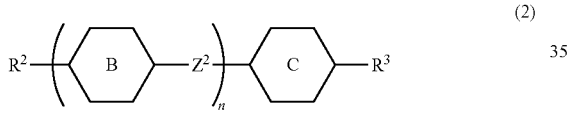
(2)

in formula (2), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; n is 1, 2 or 3.

Item 6. The liquid crystal display device according to 5, wherein the second component of the liquid crystal composition is at least one compound selected from the group of compounds represented by formula (2-1) to formula (2-13):

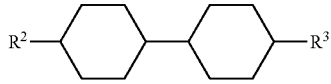
(2-1)

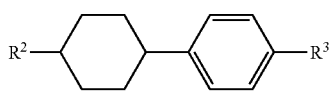
(2-2)

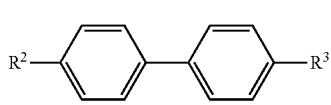
(2-3)

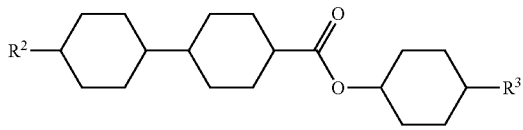
(2-4)

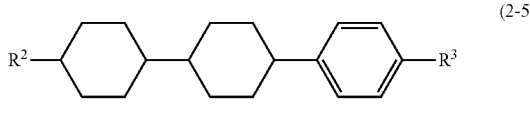
(2-5)

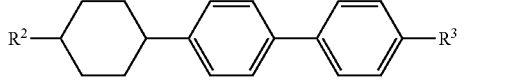
(2-6)

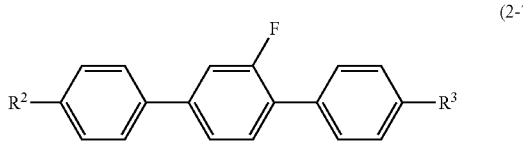
(2-7)

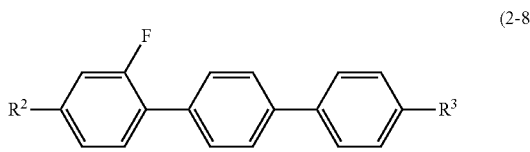
(2-8)

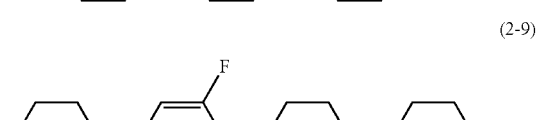
(2-9)

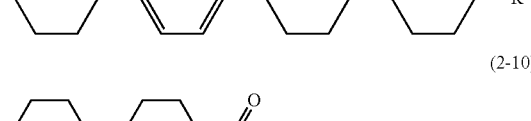
(2-10)

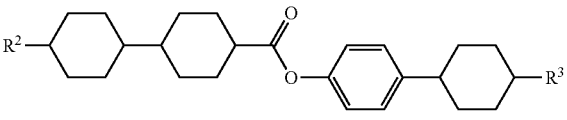
(2-11)

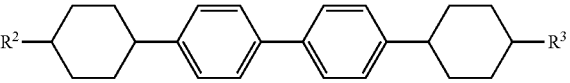
(2-12)

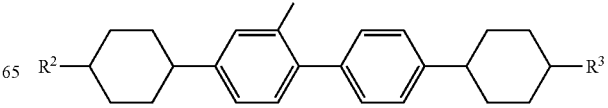

(2-13)

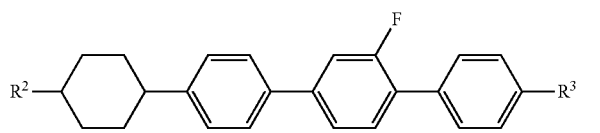

in formula (2-1) to formula (2-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen.

Item 7. The liquid crystal display device according to item 5 or 6, wherein the proportion of the second component of the liquid crystal composition is in the range of 40% by weight to 80% by weight based on the weight of the liquid crystal composition.

Item 8. The liquid crystal display device according to any one of items 1 to 7, wherein the liquid crystal composition includes at least one compound selected from the group of compounds represented by formula (3) as a third component:

(3)

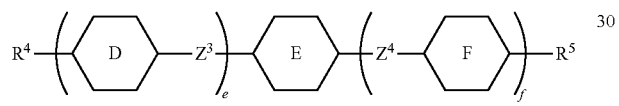

in formula (3), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen; ring D and ring F are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; e is 1, 2 or 3, f is 0 or 1; and the sum of e and f is 3 or less.

Item 9. The liquid crystal display device according to 8, wherein the third component of the liquid crystal composition is at least one compound selected from the group of compounds represented by formula (3-1) to formula (3-19):

(3-1)

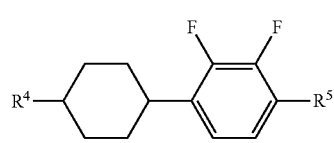

(3-2)

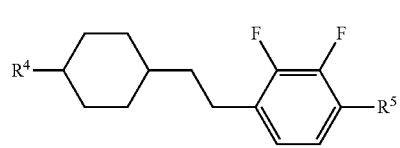

(3-3)

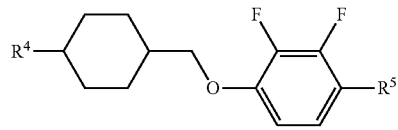

(3-4)

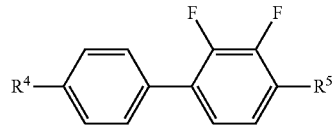

(3-5)

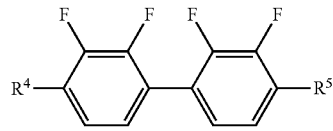

(3-6)

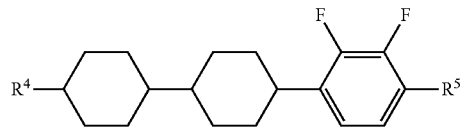

(3-7)

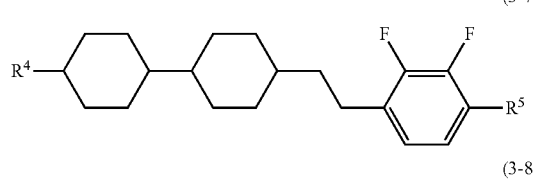

(3-8)

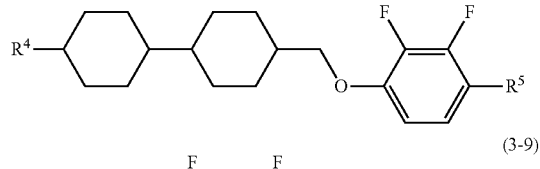

(3-9)

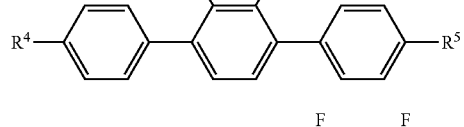

(3-10)

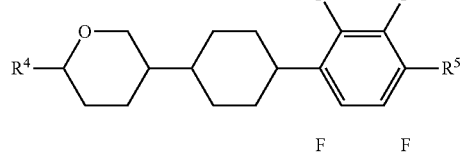

(3-11)

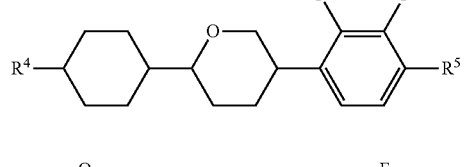

(3-12)

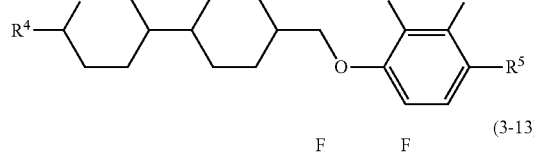

(3-13)

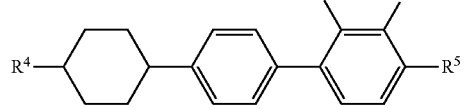

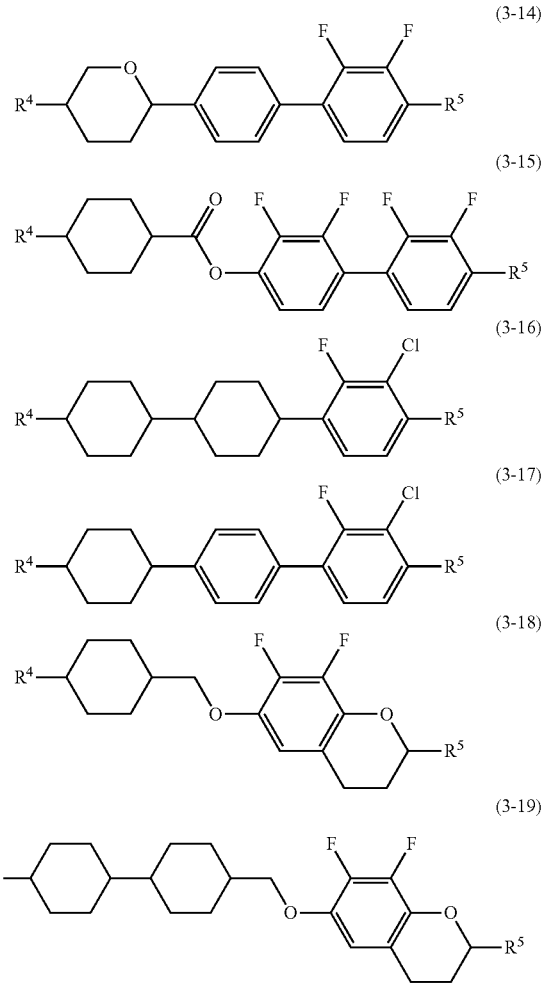

in formula (3-1) to formula (3-19), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen.

Item 10. The liquid crystal display device according to item 8 or 9, wherein the proportion of the third component of the liquid crystal composition is in the range of 3% by weight to 20% by weight based on the weight of the liquid crystal composition.

Item 11. The liquid crystal display device according to any one of items 1 to 10, wherein in the liquid crystal composition, the maximum temperature of a nematic phase is 70° C. or higher, the optical anisotropy (measured at 25° C.) at a wavelength of 589 nanometers is 0.07 or more, and the dielectric anisotropy (measured at 25° C.) at a frequency of 1 kHz is 2 or more.

Item 12. The liquid crystal display device according to any one of items 1 to 11, wherein an operating mode of the liquid crystal display device is a TN mode, an ECB mode, an OCB mode, an IPS mode, an FFS mode or an FPA mode and a driving mode of the liquid crystal display device is an active matrix mode.

Item 13. The liquid crystal display device according to any one of items 1 to 11, wherein an operating mode of the liquid crystal display device is an IPS mode or FFS mode, and a driving mode of the liquid crystal display device is an active matrix mode.

Item 14. A liquid crystal composition included in a liquid crystal display device according to any one of items 1 to 13.

Item 15. Use of the liquid crystal composition according to item 14 for the liquid crystal display device.

The invention also includes the following items. (a) The composition described above, further including at least one of additives such as an optically active compound, an antioxidant, an ultraviolet light absorber, a coloring matter, an antifoaming agent, a polymerizable compound, a polymerization initiator and a polymerization inhibitor. (b) The AM device including the composition described above. (c) An AM device with a polymer sustained alignment (PSA) type, including the composition described above that further includes a polymerizable compound. (d) An AM device with a polymer sustained alignment (PSA) type including the composition described above, where a polymerizable compound in this composition is polymerized. (e) A device including the composition described above where a polymerizable compound in this composition is polymerized, and having a mode of PC, TN, STN, ECB, OCB, IPS, FFS or FPA. (f) A transmission-type device including the composition described above and a polymerizable compound in this composition is polymerized. (g) Use of the composition described above, as a composition having a nematic phase. (h) Use of the composition prepared by the addition of an optically active compound to the composition described above, as an optically active composition.

The liquid crystal display device of the invention includes a first substrate and a second substrate and a liquid crystal composition having positive dielectric anisotropy that is placed between these substrates, wherein the flicker rate of the liquid crystal display device is in the range of 0% to 1%. The flicker rate (%) is expressed by [|(brightness when positive voltage is applied)−(brightness when negative voltage is applied)|]/average brightness×100. The flicker relates to image burn-in, and it is estimated that the flicker is caused by the difference between electric potential of the positive frame and the negative frame when the device is driven by an alternating current. The generation of the flicker can be suppressed by suitably selecting the component of the composition included in the device.

The composition of the invention will be explained in the following order. First, the constitution of component compounds in the composition will be explained. Second, the main characteristics of the component compounds and the main effects of these compounds on the composition will be explained. Third, a combination of the components in the composition, a desirable proportion of the components and its basis will be explained. Fourth, a desirable embodiment of the component compounds will be explained. Fifth, desirable component compounds will be shown. Sixth, additives that may be added to the composition will be explained. Seventh, methods for synthesizing the component compounds will be explained. Last, the use of the composition will be explained.

First, the constitution of component compounds in the composition will be explained. The compositions of the invention are classified into composition A and composition B. Composition A may further include any other liquid crystal compound, an additive and so forth, in addition to liquid crystal compounds selected from compound (1), compound (2) and compound (3). "Any other liquid crystal compound" is a liquid crystal compound that is different from compound (1), compound (2) and compound (3). Such a compound is mixed with the composition for the purpose of further adjusting the characteristics. The additive includes an optically active compound, an antioxidant, an ultraviolet light absorber, a coloring matter, an antifoaming agent, a polymerizable compound, a polymerization initiator and a polymerization inhibitor.

Composition B consists essentially of liquid crystal compounds selected from compound (1), compound (2) and compound (3). The term "essentially" means that the composition may include an additive, but does not include any other liquid crystal compound. Composition B has a smaller number of components than composition A. Composition B is preferable to composition A in view of cost reduction. Composition A is preferable to composition B in view of the fact that characteristics can be further adjusted by mixing with any other liquid crystal compound.

Second, the main characteristics of the component compounds and the main effects of these compounds on the characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S mean a classification based on a qualitative comparison among the component compounds, and the symbol 0 means that the value is zero or close to zero.

TABLE 2

Characteristics of Compounds

| Characteristics | Compound (1) | Compound (2) | Compound (3) |
| --- | --- | --- | --- |
| Maximum Temperature | S—L | S—L | S—M |
| Viscosity | M—L | S—M | |
| Optical Anisotropy | M—L | M—L | M—L |
| Dielectric Anisotropy | S—L[1)] | 0 | M—L[2)] |
| Specfic Resistance | L | L | L |

[1)]The value of the dielectric anisotropy is positive.
[2)]The value of the dielectric anisotropy is negative, and the symbol expresses the magnitude of the absolute value.

The main effects of the component compounds on the characteristics of the composition upon mixing the component compounds with the composition are as follows. The first component is compound (1) in which the dielectric anisotropy is positive. Compound (1) decreases the minimum temperature, and increases the dielectric anisotropy. The second component is compound (2) in which the dielectric anisotropy is zero or close to zero. Compound (2) decreases the viscosity or increases the maximum temperature. The third component is a compound (3) in which the dielectric anisotropy is negative. Compound (3) increases the dielectric constant in the minor axis direction.

Third, a combination of the components in the composition, a desirable proportion of the components and its basis will be explained. A combination of the components in the composition is the first and second components, the first, second and third components, and the first and third components. A desirable combination of the component is the first and second components. A desirable combination of the component is also the first, second and third components.

A desirable proportion of the first component is, approximately 15% by weight or more for increasing the dielectric anisotropy, and approximately 60% by weight or less for decreasing the minimum temperature or for decreasing the viscosity. A more desirable proportion is in the range of approximately 15% by weight to approximately 50% by weight. An especially desirable proportion is in the range of approximately 15% by weight to approximately 40% by weight.

A desirable proportion of the second component is approximately 40% by weight or more for increasing the maximum temperature or for decreasing the viscosity, and approximately 80% by weight or less for increasing the dielectric anisotropy. A more desirable proportion is in the range of approximately 40% by weight to approximately 75% by weight. An especially desirable proportion is in the range of approximately 40% by weight to approximately 70% by weight. As the proportion of the second component such as compound (2-1), compound (2-2) and compound (2-3) is increased, the threshold voltage of the device increases, however the viscosity is decreased. It is thus desirable that the proportion of the second component should be increased as long as the specifications for the threshold voltage of the device are satisfied.

A desirable proportion of the third component is approximately 3% by weight or more for increasing the dielectric constant in the minor axis direction, and approximately 20% by weight or less for decreasing the minimum temperature. A more desirable proportion is in the range of approximately 5% by weight to approximately 20% by weight. An especially desirable proportion is in the range of approximately 5% by weight to approximately 15% by weight.

Fourth, a desirable embodiment of the component compounds will be explained. Compound (1), compound (2) and compound (3) are explained simultaneously. These apply also to the corresponding sub-formulas. $R^1$ is alkyl having 1 to 12 carbons, alkoxy having 1 to 12 carbons or alkenyl having 2 to 12 carbons. Desirable $R^1$ is alkyl having 1 to 12 carbons for increasing the stability to ultraviolet light or heat. $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen. Desirable $R^2$ or $R^3$ is alkyl having 1 to 12 carbons for increasing the stability to ultraviolet light or heat for instance, and alkenyl having 2 to 12 carbons for decreasing the minimum temperature or for decreasing the viscosity. $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen. Desirable $R^4$ or $R^5$ is alkyl having 1 to 12 carbons for increasing the stability, and alkoxy having 1 to 12 carbons for increasing the dielectric constant in the minor axis direction.

In $R^1$ to $R^5$, the alkyl is straight-chain or branched-chain, and does not include cycloalkyl such as cyclohexyl. Straight-chain alkyl is preferable to branched-chain alkyl. These apply also to alkoxy, alkenyl, alkenyloxy, alkyl having 1 to 12 carbons in which at least one hydrogen has been replaced by halogen and so forth. Halogen means fluorine, chlorine, bromine and iodine. Desirable halogen is fluorine and chlorine. More desirable halogen is fluorine.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH═CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. Cis is preferable in the alkenyl such as 2-butenyl, 2-pentenyl and 2-hexenyl.

Desirable alkenyloxy is vinyloxy, allyloxy, 3-butenyloxy, 3-pentenyloxy or 4-pentenyloxy. More desirable alkenyloxy is allyloxy or 3-butenyloxy for decreasing the viscosity.

Desirable examples of alkyl in which at least one hydrogen has been replaced by halogen are fluoromethyl, 2-fluoroethyl, 3-fluoropropyl, 4-fluorobutyl, 5-fluoropentyl, 6-fluorohexyl, 7-fluoroheptyl or 8-fluorooctyl. More desirable examples are 2-fluoroethyl, 3-fluoropropyl, 4-fluorobutyl or 5-fluoropentyl for increasing the dielectric anisotropy.

Desirable examples of alkenyl in which at least one hydrogen has been replaced by halogen are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

Ring A is 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyrimidine-2,5-diyl, 1,3-dioxane-2,5-diyl, tetrahydropyran-2,5-diyl or naphthalene-2,6-diyl. Desirable ring A is 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyrimidine-2,5-diyl, 1,3-dioxane-2,5-diyl or tetrahydropyran-2,5-diyl for decreasing the flicker rate, and 1,4-phenylene or 2-fluoro-1,4-phenylene for increasing the optical anisotropy.

Ring B and ring C are independently 1,4-cyclohexylene, 1,4-phenylene, 2-fluoro-1,4-phenylene or 2,5-difluoro-1,4-phenylene. Desirable ring B or ring C is 1,4-cyclohexylene for decreasing the viscosity, and 1,4-phenylene for increasing the optical anisotropy.

Ring D and ring F are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl. Desirable examples of "1,4-phenylene in which at least one hydrogen has been replaced by fluorine or chlorine" are 2-fluoro-1,4-phenylene, 2,3-difluoro-1,4-phenylene or 2-chloro-3-fluoro-1,4-phenylene. Desirable ring D or ring F is 1,4-cyclohexylene for decreasing the viscosity, and tetrahydropyran-2,5-diyl for increasing the dielectric anisotropy, and 1,4-phenylene for increasing the optical anisotropy.

Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring E is 2,3-difluoro-1,4-phenylene for decreasing the viscosity, and 2-chloro-3-fluoro-1,4-phenylene for decreasing the optical anisotropy, and 7,8-difluorochroman-2,6-diyl for increasing the dielectric constant in the minor axis direction.

With regard to the configuration of 1,4-cyclohexylene, trans is preferable to cis for increasing the maximum temperature. Tetrahydropyran-2,5-diyl is

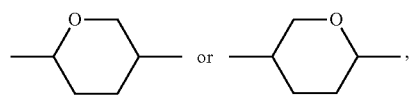

preferably

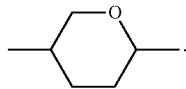

$Z^1$ is a single bond, ethylene, vinylene, methyleneoxy, carbonyloxy or difluoromethyleneoxy. Desirable $Z^1$ is difluoromethyleneoxy for increasing the dielectric anisotropy. $Z^2$ is a single bond, ethylene or carbonyloxy. Desirable $Z^2$ is a single bond for decreasing the viscosity. $Z^3$ and $Z^4$ are independently a single bond, ethylene, carbonyloxy or methyleneoxy. Desirable $Z^3$ or $Z^4$ is a single bond for decreasing the viscosity, and methyleneoxy for increasing the dielectric constant in the minor axis direction.

$X^1$ and $X^2$ are independently hydrogen or fluorine. Desirable $X^1$ or $X^2$ is fluorine for increasing the dielectric anisotropy. Compounds where $X^1$ is hydrogen and $X^2$ is fluorine have larger dielectric anisotropy than compounds where $X^1$ and $X^2$ is hydrogen. Compounds where $X^1$ and $X^2$ are fluorine have a larger dielectric anisotropy.

$Y^1$ is fluorine, chlorine, alkyl having 1 to 12 carbons in which at least one hydrogen has been replaced by halogen, alkoxy having 1 to 12 carbons in which at least one hydrogen has been replaced by halogen or alkenyloxy having 2 to 12 carbons in which at least one hydrogen has been replaced by halogen. Desirable $Y^1$ is fluorine, chlorine, trifluoromethyl or trifluoromethoxy for decreasing the minimum temperature. More desirable $Y^1$ is fluorine, trifluoromethyl or trifluoromethoxy. Especially desirable $Y^1$ is fluorine.

Desirable examples of alkyl in which at least one hydrogen has been replaced by halogen are trifluoromethyl. Desirable examples of alkoxy in which at least one hydrogen has been replaced by halogen are trifluoromethoxy. Desirable examples of alkenyloxy in which at least one hydrogen has been replaced by halogen are trifluorovinyloxy.

m is 1, 2, 3 or 4. Desirable m is 1, 2 or 3. More desirable m is 2 for decreasing the minimum temperature, and is 3 for increasing the dielectric anisotropy. n is 1, 2 or 3. Desirable n is 1 for decreasing the viscosity, and is 2 or 3 for increasing the maximum temperature. More desirable n is 1 or 2. More desirable n is also 2 or 3. e is 1, 2 or 3, f is 0 or 1, and the sum of e and f is 3 or less. Desirable e is 1 for decreasing the viscosity, and is 2 or 3 for increasing the maximum temperature. Desirable f is 0 for decreasing the viscosity, and is 1 for decreasing the minimum temperature. A desirable sum of e and f is 1 or 2.

Fifth, desirable component compounds will be shown. The first component is compound (1) in which the dielectric anisotropy is positive. Desirable compound (1) is compound (1-1) to compound (1-21) described in item 3. Desirable compounds in view of suppressing the flicker are as follows. Compounds having a single bond or difluoromethyleneoxy are preferable to compounds having ethylene or carbonyloxy. Compounds having 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyrimidine-2,5-diyl, 1,3-dioxane-2,5-diyl, tetrahydropyran-2,5-diyl or naphthalene-2,6-diyl are preferable to compounds having 1,4-cyclohexylene.

In these compounds, it is desirable that at least one of the first component should be compound (1-6), compound (1-9), compound (1-10), compound (1-11), compound (1-12), compound (1-13), compound (1-15), compound (1-17), compound (1-18), compound (1-19), compound (1-20) or compound (1-21). It is desirable that the sum of these compounds should be in the range of 50% by weight to 100% by weight based on the weight of the first component. It is desirable that the sum of these compounds should be in the range of 10% by weight to 80% by weight based on the weight of the liquid crystal composition. It is more desirable that the sum of these compounds should be in the range of 20% by weight to 60% by weight based on the weight of the liquid crystal composition.

The second component is compound (2) in which the dielectric anisotropy is zero or close to zero. Desirable compound (2) is compound (2-1) to compound (2-13) described in item 6. In these compounds, it is desirable that at least one of the second component should be compound (2-1), compound (2-3), compound (2-5), compound (2-6) or compound (2-7). It is desirable that at least two of the second component should be a combination of compound (2-1) and compound (2-3), or compound (2-1) and compound (2-5).

The third component is the compound (3) in which the dielectric anisotropy is negative. Desirable compound (3) is compound (3-1) to compound (3-19) described in item 9. Desirable compounds in view of suppressing the flicker are as follows. Compounds having a single bond or ethylene are preferable to compounds having methyleneoxy. Compounds having 1,4-cyclohexylene or 1,4-phenylene are preferable to compounds having tetrahydropyran-2,5-diyl. More desirable compounds are compound (3-1), compound (3-2), compound (3-4), compound (3-6), compound (3-7), compound (3-9), compound (3-13), compound (3-16) and compound (3-17).

Sixth, additives that may be added to the composition will be explained. Such additives include an optically active compound, an antioxidant, an ultraviolet light absorber, a coloring matter, an antifoaming agent, a polymerizable compound, a polymerization initiator and a polymerization inhibitor. The optically active compound is added to the composition for the purpose of inducing the helical structure of liquid crystal molecules and giving a twist angle. Examples of such compounds include compound (4-1) to compound (4-5). A desirable proportion of the optically active compound is approximately 5% by weight or less, and a more desirable proportion is in the range of approximately 0.01% by weight to approximately 2% by weight.

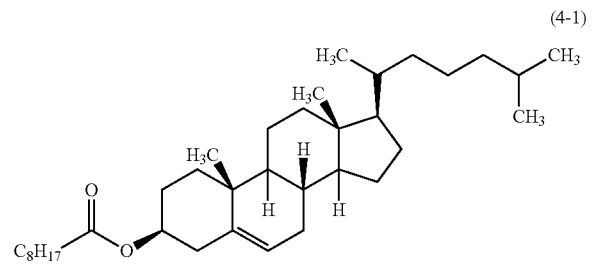

(4-1)

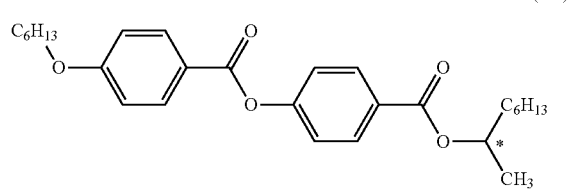

(4-2)

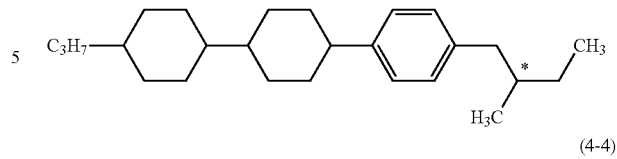

(4-3)

(4-4)

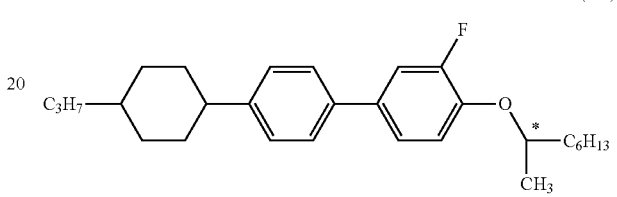

(4-5)

The antioxidant is added to the composition in order to prevent a decrease in specific resistance that is caused by heating under air, or to maintain a large voltage holding ratio at a temperature close to the maximum temperature as well as at room temperature, after the device has been used for a long time. A desirable example of the antioxidant is compound (5) where t is an integer from 1 to 9, for instance.

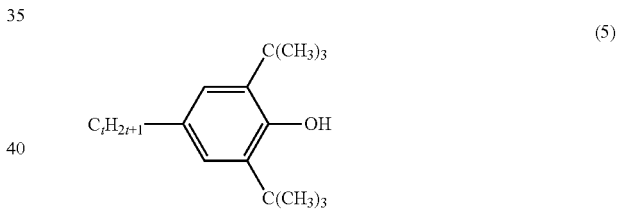

(5)

In compound (5), desirable t is 1, 3, 5, 7 or 9. More desirable t is 7. Compound (5) where t is 7 is effective in maintaining a large voltage holding ratio at a temperature close to the maximum temperature as well as at room temperature, after the device has been used for a long time, since it has a small volatility. A desirable proportion of the antioxidant is approximately 50 ppm or more for achieving its effect and is approximately 600 ppm or less for avoiding a decrease in the maximum temperature or avoiding an increase in the minimum temperature. A more desirable proportion is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable proportion of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable proportion is in the range of approximately 100 ppm to approximately 10,000 ppm.

A dichroic dye such as an azo dye or an anthraquinone dye is added to the composition for adjusting to a device having a guest host (GH) mode. A desirable proportion of the coloring matter is in the range of approximately 0.01% by weight to approximately 10% by weight. The antifoaming agent such as dimethyl silicone oil or methyl phenyl silicone oil is added to the composition for preventing foam formation. A desirable proportion of the antifoaming agent is approximately 1 ppm or more for achieving its effect and is approximately 1,000 ppm or less for avoiding a poor display. A more desirable proportion is in the range of approximately 1 ppm to approximately 500 ppm.

The polymerizable compound is added to the composition for adjusting to a device with a PSA (polymer sustained alignment) type. Desirable examples of the polymerizable compound include compounds such as acrylates, methacrylates, vinyl compounds, vinyloxy compounds, propenyl ethers, epoxy compounds (oxiranes, oxetanes) and vinyl ketones. More desirable examples are acrylate derivatives or methacrylate derivatives. A desirable proportion of the polymerizable compound is approximately 0.05% by weight or more for achieving its effect and is approximately 10% by weight or less for avoiding a poor display. A more desirable proportion is in the range of approximately 0.1% by weight to approximately 2% by weight.

The polymerizable compound is polymerized on irradiation with ultraviolet light. It may be polymerized in the presence of an initiator such as a photopolymerization initiator. Suitable conditions for polymerization, and a suitable type and amount of the initiator are known to a person skilled in the art and are described in the literature. For example, Irgacure 651 (registered trademark; BASF), Irgacure 184 (registered trademark; BASF) or Darocur 1173 (registered trademark; BASF), each of which is a photoinitiator, is suitable for radical polymerization. A desirable proportion of the photopolymerization initiator is in the range of approximately 0.1% by weight to approximately 5% by weight based on the weight of the polymerizable compound. A more desirable proportion is in the range of approximately 1% by weight to approximately 3% by weight.

The polymerization inhibitor may be added in order to prevent the polymerization when a polymerizable compound is kept in storage. The polymerizable compound is usually added to the composition without removing the polymerization inhibitor. Examples of the polymerization inhibitor include hydroquinone derivatives such as hydroquinone and methylhydroquinone, 4-t-butylcatechol, 4-methoxyphenol and phenothiazine.

Seventh, methods for synthesizing the component compounds will be explained. These compounds can be synthesized by known methods. The synthetic methods will be exemplified as follows. Compound (1-2) and compound (1-7) are prepared by the method described in JP H02-233626 A (1990). Compound (2-1) is prepared by the method described in JP S59-176221 A (1984). Compound (2-13) is prepared by the method described in JP H02-237949 A (1990). Compound (3-1) and compound (3-6) are prepared by the method described in JP H02-503441 A (1990). The compound of formula (5) where t is 1 is available from Sigma-Aldrich Corporation. Compound (5) where t is 7, for instance, is synthesized according to the method described in U.S. Pat. No. 3,660,505.

Compounds whose synthetic methods are not described here can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin-Jikken Kagaku Kouza" (New experimental Chemistry Course, in English; Maruzen Co., Ltd., Japan). The composition is prepared according to known methods using the compounds thus obtained. For example, the component compounds are mixed and dissolved in each other by heating.

Last, the use of the composition will be explained. The composition of the invention mainly has a minimum temperature of approximately −10° C. or lower, a maximum temperature of approximately 70° C. or higher, and an optical anisotropy in the range of approximately 0.07 to approximately 0.20. A composition having an optical anisotropy in the range of approximately 0.08 to approximately 0.25 may be prepared by adjusting the proportion of the component compounds or by mixing with any other liquid crystal compound. A composition having an optical anisotropy in the range of approximately 0.10 to approximately 0.30 may be prepared by trial and error. A device including this composition has a large voltage holding ratio. This composition is suitable for an AM device. This composition is suitable especially for an AM device having a transmission type. This composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA and FPA. It is especially desirable to use the composition for the AM device having a mode of TN, OCB, IPS or FFS. In the AM device having the IPS or FFS mode, the orientation of liquid crystal molecules may be parallel or perpendicular to the glass substrate, when no voltage is applied. These devices may be of a reflection type, a transmission type or a semi-transmission type. It is desirable to use the composition for a device having the transmission type. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

EXAMPLES

The invention will be explained in more detail by way of examples. The invention is not limited to the examples. The invention includes a mixture of the composition in Example 1 and the composition in Example 2. The invention also includes a mixture prepared by mixing at least two compositions in Examples. Compounds prepared herein were identified by methods such as NMR analysis. The characteristics of the compounds, compositions and devices were measured by the methods described below.

NMR Analysis:

A model DRX-500 apparatus made by Bruker BioSpin Corporation was used for measurement. In the measurement of $^1$H-NMR, a sample was dissolved in a deuterated solvent such as $CDCl_3$, and the measurement was carried out under the conditions of room temperature, 500 MHz and the accumulation of 16 scans. Tetramethylsilane was used as an internal standard. In the measurement of $^{19}$F-NMR, $CFCl_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Gas Chromatographic Analysis:

A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (length 50 meters, bore 0.25 millimeter, film thickness 0.25 micrometer) made by Shimadzu Corporation may also be used for the purpose of avoiding an overlap of peaks of the compounds.

The proportion of the liquid crystal compounds included in the composition may be calculated according to the following method. A mixture of the liquid crystal compounds is analyzed by gas chromatography (FID). The ratio of peak areas in the gas chromatogram corresponds to the proportion of the liquid crystal compounds. When the capillary columns described above are used, the correction coefficient of respective liquid crystal compounds may be regarded as 1 (one). Accordingly, the proportion (percentage by weight) of the liquid crystal compounds can be calculated from the ratio of peak areas.

Samples for Measurement:

A composition itself was used as a sample when the characteristics of the composition or the device were measured. When the characteristics of a compound were measured, a sample for measurement was prepared by mixing this compound (15% by weight) with mother liquid crystals (85% by weight). The characteristic values of the compound were calculated from the values obtained from measurements by an extrapolation method: (Extrapolated value)= (Measured value of sample)−0.85×(Measured value of mother liquid crystals)/0.15. When a smectic phase (or crystals) deposited at 25° C. at this ratio, the ratio of the compound to the mother liquid crystals was changed in the order of (10% by weight: 90% by weight), (5% by weight: 95% by weight) and (1% by weight: 99% by weight). The values of the maximum temperature, the optical anisotropy, the viscosity and the dielectric anisotropy regarding the compound were obtained by means of this extrapolation method.

The mother liquid crystals described below were used. The proportion of the component compounds were expressed as a percentage by weight.

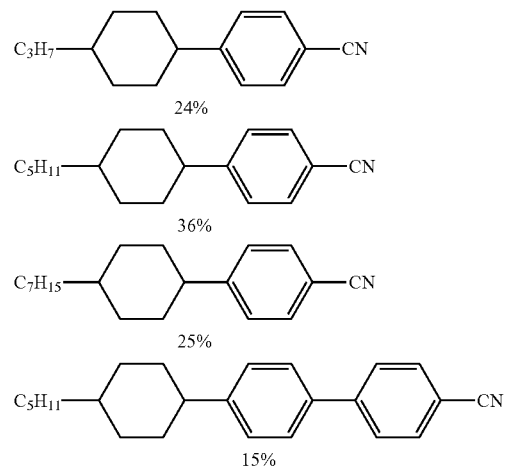

Measurement Methods:

The characteristics were measured according to the following methods. Most are methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Maximum Temperature of a Nematic Phase (NI; ° C.):

A sample was placed on a hot plate in a melting point apparatus equipped with a polarizing microscope and was heated at the rate of 1° C. per minute. The temperature was measured when a part of the sample began to change from a nematic phase to an isotropic liquid.

(2) Minimum Temperature of a Nematic Phase (Tc; ° C.):

A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C.

(3) Viscosity (Bulk Viscosity; $\eta$; Measured at 20° C.; mPa·s):

An E-type viscometer made by Tokyo Keiki Inc. was used for measurement.

(4) Viscosity (Rotational Viscosity; $\gamma 1$; Measured at 25° C.; mPa·s):

The measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage was applied to this device and increased stepwise with an increment of 0.5 volt in the range of 16 to 19.5 volts. After a period of 0.2 second with no voltage, a voltage was applied repeatedly under the conditions of a single rectangular wave alone (rectangular pulse; 0.2 second) and of no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of dielectric anisotropy necessary for this calculation was obtained by use of the device that had been used for the measurement of rotational viscosity, according to the method that will be described below.

(5) Optical Anisotropy (Refractive Index Anisotropy; Δn; Measured at 25° C.):

The measurement was carried out using an Abbe refractometer with a polarizing plate attached to the ocular, using light at a wavelength of 589 nanometers. The surface of the main prism was rubbed in one direction, and then a sample was placed on the main prism. The refractive index (n∥) was measured when the direction of the polarized light was parallel to that of rubbing. The refractive index (n⊥) was measured when the direction of polarized light was perpendicular to that of rubbing. The value of the optical anisotropy was calculated from the equation: Δn=n∥−n⊥.

(6) Dielectric Anisotropy (Δε; Measured at 25° C.):

A sample was poured into a TN device in which the distance between the two glass substrates (cell gap) was 9 micrometers and the twist angle was 80 degrees. Sine waves (10 V, 1 kHz) were applied to this device, and the dielectric constant (ε∥) in the major axis direction of liquid crystal molecules was measured after 2 seconds. Sine waves (0.5 V, 1 kHz) were applied to this device and the dielectric constant (ε⊥) in the minor axis direction of the liquid crystal molecules was measured after 2 seconds. The value of dielectric anisotropy was calculated from the equation: Δε=ε∥−ε⊥.

(7) Threshold Voltage (Vth; Measured at 25° C.; V):

An LCD evaluation system Model LCD-5100 made by Otsuka Electronics Co., Ltd. was used for measurement. The light source was a halogen lamp. A sample was poured into a TN device having a normally white mode, in which the distance between the two glass substrates (cell gap) was 4.45/Δn (micrometers) and the twist angle was 80 degrees. A voltage to be applied to this device (32 Hz, rectangular waves) was stepwise increased in 0.02 V increments from 0 V up to 10 V. The device was vertically irradiated with light simultaneously, and the amount of light passing through the device was measured. A voltage-transmittance curve was prepared, in which the maximum amount of light corresponded to 100% transmittance and the minimum amount of light corresponded to 0% transmittance. The threshold voltage was expressed as voltage at 90% transmittance.

(8) Voltage Holding Ratio (VHR-1; Measured at 25° C.; %):

A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 16.7 milliseconds with a high-speed voltmeter, and area A between the voltage curve and the horizontal axis in a unit cycle was obtained. Area B was an area without the decrease. The voltage holding ratio was expressed as a percentage of area A to area B.

(9) Voltage Holding Ratio (VHR-2; Measured at 80° C.; %):

The voltage holding ratio was measured by the method described above, except that it was measured at 80° C. instead of 25° C. The resulting values were represented by the symbol VHR-2.

(10) Voltage Holding Ratio (VHR-3; Measured at 25° C.; %):

The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra-high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

(11) Voltage Holding Ratio (VHR-4; Measured at 25° C.; %):

A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

(12) Response Time (τ; Measured at 25° C.; Millisecond):

An LCD evaluation system Model LCD-5100 made by Otsuka Electronics Co., Ltd. was used for measurement. The light source was a halogen lamp. The low-pass filter was set at 5 kHz. A sample was poured into a TN device having a normally white mode, in which the distance between the two glass substrates (cell gap) was 5.0 micrometers and the twist angle was 80 degrees. Rectangular waves (60 Hz, 5 V, 0.5 second) were applied to this device. The device was vertically irradiated with light simultaneously, and the amount of light passing through the device was measured. The transmittance was regarded as 100% when the amount of light reached a maximum. The transmittance was regarded as 0% when the amount of light reached a minimum. Rise time (τr; millisecond) was the time required for a change from 90% to 10% transmittance. Fall time (τf; millisecond) was the time required for a change from 10% to 90% transmittance. The response time was expressed as the sum of the rise time and the fall time thus obtained.

(13) Elastic Constants (K; Measured at 25° C.; pN):

A LCR meter Model HP 4284-A made by Yokokawa Hewlett-Packard, Ltd. was used for measurement. A sample was poured into a homogeneous device in which the distance between the two glass substrates (cell gap) was 20 micrometers. An electric charge of 0 volts to 20 volts was applied to this device, and the electrostatic capacity and the applied voltage were measured. The measured values of the electric capacity (C) and the applied voltage (V) were fitted to equation (2.98) and equation (2.101) on page 75 of "Ekisho Debaisu Handobukku" (Liquid Crystal Device Handbook, in English; The Nikkan Kogyo Shimbun, Ltd., Japan) and the values of K11 and K33 were obtained from equation (2.99). Next, the value of K22 was calculated from equation (3.18) on page 171 of the book and the values of K11 and K33 thus obtained. The elastic constant K was expressed as an average value of K11, K22 and K33.

(14) Specific Resistance (ρ; Measured at 25° C.; ΩCm):

A sample of 1.0 milliliter was poured into a vessel equipped with electrodes. A DC voltage (10 V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

(15) Flicker Rate (Measured at 25° C.; %):

A multimedia display tester 3298F made by Yokogawa Electric Corporation was used for measurement. The light source was LED. A sample was poured into a FFS device having a normally black mode, in which the distance between the two glass substrates (cell gap) was 3.5 micrometers and the rubbing direction was antiparallel. This device was sealed with a UV-curable adhesive. A voltage was applied to the device and a voltage was measured when the amount of light passed through the device reached a maximum. The sensor was approximated to the device while this voltage was applied to the device, and the flicker rate displayed was recorded.

(16) Helical Pitch (P; Measured at Room Temperature; Micrometer):

The helical pitch was measured according to the wedge method (see page 196 of "Ekishou Binran" (Liquid Crystal Handbook, in English; Maruzen, Co., LTD., Japan, 2000). After a sample had been injected into a wedge-shaped cell and the cell had been allowed to stand at room temperature for 2 hours, the distance (d2−d1) between disclination lines was observed with a polarizing microscope (Nikon Corporation, Model MM-40/60 series). The helical pitch (P) was calculated from the following equation, wherein θ was defined as the angle of the wedge cell: $P = 2 \times (d2-d1) \times \tan\theta$.

(17) Dielectric Constant in the Minor Axis Direction ($\varepsilon\perp$; Measured at 25° C.):

A sample was poured into a TN device in which the distance between the two glass substrates (cell gap) was 9 micrometers and the twist angle was 80 degrees. Sine waves (0.5 V, 1 kHz) were applied to this device and the dielectric constant ($\varepsilon\perp$) in the minor axis direction of the liquid crystal molecules was measured after 2 seconds.

The compounds described in Examples were expressed in terms of symbols according to the definition in Table 3 described below. In Table 3, the configuration of 1,4-cyclohexylene is trans. The parenthesized number next to a symbolized compound in Example corresponds to the number of the compound. The symbol (-) means any other liquid crystal compound. The proportion (percentage) of a liquid crystal compound means the percentages by weight (% by weight) based on the weight of the liquid crystal composition. Last, the values of characteristics of the composition are summarized.

TABLE 3

Method of Description of Compounds using Symbols
$R-(A_1)-Z_1-\ldots-Z_n-(A_n)-R'$

| 1) Left-terminal Group R— | Symbol |
|---|---|
| $C_nH_{2n+1}-$ | n- |
| $C_nH_{2n+1}O-$ | nO— |
| $C_mH_{2m+1}OC_nH_{2n}-$ | mOn- |
| $CH_2=CH-$ | V— |
| $C_nH_{2n+1}-CH=CH-$ | nV— |
| $CH_2=CH-C_nH_{2n}-$ | Vn- |
| $C_mH_{2m+1}-CH=CH-C_nH_{2n}-$ | mVn- |
| $CF_2=CH-$ | VFF— |
| $CF_2=CH-C_nH_{2n}-$ | VFFn- |
| $F-C_nH_{2n}-$ | Fn- |

| 2) Right-terminal Group —R' | Symbol |
|---|---|
| $-C_nH_{2n+1}$ | -n |
| $-OC_nH_{2n+1}$ | —On |
| $-CH=CH_2$ | —V |
| $-CH=CH-C_nH_{2n+1}$ | —Vn |
| $-OC_nH_{2n}-CH=CH_2$ | -nV |
| $-OC_nH_{2n}-CH=CH-OC_mH_{2m+1}$ | -nVm |
| $-CH=CF_2$ | —VFF |
| $-COOCH_3$ | —EMe |
| —F | —F |
| —Cl | —CL |
| $-OCF_3$ | —OCF3 |
| $-CF_3$ | —CF3 |
| —CN | —C |

| 3) Bonding Group —$Z_n$— | Symbol |
|---|---|
| $-C_2H_4-$ | 2 |
| —COO— | E |
| —CH=CH— | V |
| —C≡C— | T |
| $-CF_2O-$ | X |
| $-CH_2O-$ | 1O |

| 4) Ring —$A_n$— | Symbol |
|---|---|
|  | H |
| 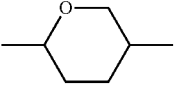 | Dh |

TABLE 3-continued
Method of Description of Compounds using Symbols
$R-(A_1)-Z_1-\ldots-Z_n-(A_n)-R'$
| Structure | Symbol |
|---|---|
| 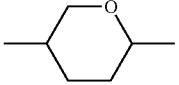 | dh |
| 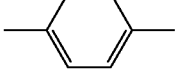 | B |
| 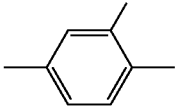 | B(F) |
| 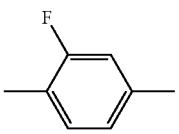 | B(2F) |
| 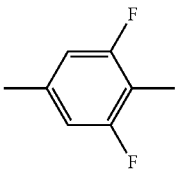 | B(F,F) |
| 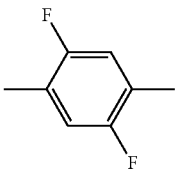 | B(2F,5F) |
| 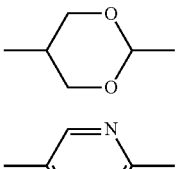 | G |
|  | Py |
| 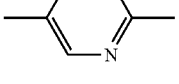 | B(2F,3F) |
5) Examples of Description
Example 1. V HBB-2
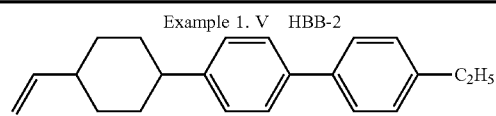
Example 2. 3-BB(F)B(F,F) F
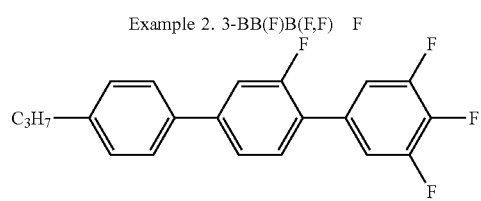

TABLE 3-continued

Method of Description of Compounds using Symbols
R—(A₁)—Z₁— . . . . . —Zₙ—(Aₙ)—R'

Example 3. 4-BB(F)B(F,F)XB(F,F)—F

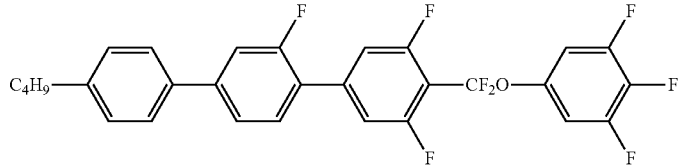

Example 4. 5-GB(F,F)XB(F,F)—F

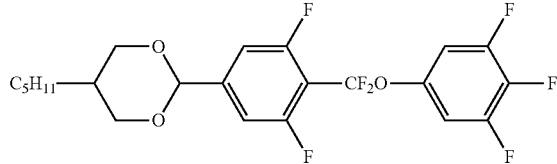

Comparative Example 1

For comparison, a composition in which compound (1) was not included was prepared. The component and the characteristics of the composition were as follows.

| | | |
|---|---|---|
| 3-HB (F) —C | (-) | 18% |
| 2-BEB (F) —C | (-) | 2% |
| 3-BEB (F) —C | (-) | 3% |
| V2-BEB (F,F) —C | (-) | 4% |
| 3-HB—O2 | (2-2) | 13% |
| 3-HHB-1 | (2-5) | 5% |
| 3-HHB—O1 | (2-5) | 3% |
| 3-HHB-3 | (2-5) | 4% |
| VFF-HHB-1 | (2-5) | 8% |
| VFF2-HHB-1 | (2-5) | 18% |
| 5-HBBH-1O1 | (-) | 4% |
| 3-HB (F) TB-2 | (-) | 6% |
| 3-HB (F) TB-3 | (-) | 6% |
| 3-HB (F) TB-4 | (-) | 6% |

NI = 106.9° C.; Tc < −20° C.;
Δn = 0.140;
Δε = 8.8;
Vth = 1.97 V;
η = 22.0 mPa · s;
flicker rate = 1.66%.

Example 1

| | | |
|---|---|---|
| 3-HHXB(F,F) —F | (1-4) | 15% |
| 3-BBXB(F,F) —F | (1-13) | 4% |
| 3-BB(F,F)XB(F,F) —F | (1-13) | 10% |
| 3-HBBXB(F,F) —F | (1-16) | 8% |
| 3-HBB(F,F)XB(F,F) —F | (1-16) | 4% |
| 3-GB(F)B(F,F)XB(F,F) —F | (1-17) | 3% |
| 4-GB(F)B(F,F)XB(F,F) —F | (1-17) | 3% |
| 3-HH —V | (2-1) | 30% |
| 3-HH —V1 | (2-1) | 7% |
| V-HHB-1 | (2-5) | 6% |
| V2-HHB-1 | (2-5) | 6% |
| 1-BB(F)B-2V | (2-7) | 4% |

NI = 86.2° C.; Tc < −30° C.;
Δn = 0.102;
Δε = 7.8;
Vth = 1.56 V;
η = 13.0 mPa · s;
flicker rate = 0.56%.

Example 2

| | | |
|---|---|---|
| 3-GB(F, F)XB(F, F)-F | (1-10) | 5% |
| 3-BB(F)B(F, F)-F | (1-12) | 9% |
| 3-BB(F, F)XB(F, F)-F | (1-13) | 17% |
| 3-HBBXB(F, F)-F | (1-16) | 7% |
| 3-GB(F)B(F, F)XB(F, F)-F | (1-17) | 2% |
| 4-GB(F)B(F, F)XB(F, F)-F | (1-17) | 4% |
| 3-BB(F)B(F, F)XB(F, F)-F | (1-19) | 2% |
| 4-BB(F)B(F, F)XB(F, F)-F | (1-19) | 6% |
| 5-BB(F)B(F, F)XB(F, F)-F | (1-19) | 6% |
| 3-HH-V | (2-1) | 21% |
| V-HHB-1 | (2-5) | 10% |
| V2-HHB-1 | (2-5) | 9% |
| 1-BB(F)B-2V | (2-7) | 2% |

NI = 79.9° C.; Tc < −30° C.; Δn = 0.129; Δε = 16.5; Vth = 1.23 V; η = 22.7 mPa · s; flicker rate = 0.50%.

Example 3

| | | |
|---|---|---|
| 3-GB(F)B(F, F)-F | (1-9) | 6% |
| 3-BB(F, F)XB(F, F)-F | (1-13) | 2% |
| 4-GB(F)B(F, F)XB(F, F)-F | (1-17) | 3% |
| 4-BB(F)B(F, F)XB(F, F)-F | (1-19) | 6% |
| 3-HH-V | (2-1) | 34% |
| 3-HH-V1 | (2-1) | 6% |
| 1-HH-2V1 | (2-1) | 6% |
| 3-HB-O2 | (2-2) | 2% |
| 3-HHB-1 | (2-5) | 3% |
| 3-HHB-O1 | (2-5) | 3% |
| V-HHB-1 | (2-5) | 12% |
| V2-HHB-1 | (2-5) | 14% |
| 2-BB(F)B-3 | (2-7) | 3% |

NI = 92.7° C.; Tc < −20° C.; Δn = 0.092; Δε = 3.4; Vth = 2.25 V; η = 10.9 mPa · s; flicker rate = 0.11%.

Example 4

| | | |
|---|---|---|
| 3-GB(F, F)XB(F, F)-F | (1-10) | 3% |
| 3-BB(F, F)XB(F, F)-F | (1-13) | 18% |
| 3-GB(F)B(F, F)XB(F, F)-F | (1-17) | 2% |
| 4-GB(F)B(F, F)XB(F, F)-F | (1-17) | 3% |
| 5-GB(F)B(F, F)XB(F, F)-F | (1-17) | 3% |
| 3-BB(F, F)XB(F)B(F, F)-F | (1-20) | 5% |

-continued

| | | |
|---|---|---|
| 3-HH-V | (2-1) | 24% |
| 3-HH-V1 | (2-1) | 8% |
| 3-HHB-1 | (2-5) | 4% |
| 3-HHB-3 | (2-5) | 4% |
| V-HHB-1 | (2-5) | 10% |
| V2-HHB-1 | (2-5) | 10% |
| 3-HBB-2 | (2-6) | 6% |

NI = 84.8° C.; Tc < −25° C.; Δn = 0.104; Δε = 8.2; Vth = 1.55 V; η = 13.7 mPa · s; flicker rate = 0.03%.

Example 5

| | | |
|---|---|---|
| 3-HHB(F, F)-F | (1-2) | 5% |
| 3-GHB(F, F)-F | (1-6) | 10% |
| 3-HBB(F, F)-F | (1-7) | 10% |
| 3-HHBB(F, F)-F | (1-14) | 6% |
| 3-HBB(F, F)XB(F, F)-F | (1-16) | 4% |
| 4-GB(F)B(F, F)XB(F, F)-F | (1-17) | 3% |
| 5-GB(F)B(F, F)XB(F, F)-F | (1-17) | 3% |
| 3-HH-V | (2-1) | 34% |
| 3-HH-V1 | (2-1) | 7% |
| V-HHB-1 | (2-5) | 7% |
| 1-BB(F)B-2V | (2-7) | 2% |
| 3-HHEBH-3 | (2-10) | 5% |
| 5-HBB(F)B-2 | (2-13) | 4% |

NI = 98.3° C.; Tc < −30° C.; Δn = 0.100; Δε = 7.1; Vth = 1.77 V; η = 21.6 mPa · s; flicker rate = 0.91%.

Example 6

| | | |
|---|---|---|
| 3-HHB-F | (1-2) | 5% |
| 3-HHEB(F, F)-F | (1-3) | 3% |
| 3-GB(F)B(F, F)-F | (1-9) | 10% |
| 4-GB(F)B(F, F)XB(F, F)-F | (1-17) | 3% |
| 4-BB(F)B(F, F)XB(F, F)-F | (1-19) | 6% |
| 3-HH-V1 | (2-1) | 6% |
| 5-HH-V | (2-1) | 14% |
| 3-HH-2V1 | (2-1) | 6% |
| 3-HH-4 | (2-1) | 11% |
| 7-HB-1 | (2-2) | 5% |
| 5-HB-O2 | (2-2) | 5% |
| 3-HHEH-3 | (2-4) | 3% |
| V-HHB-1 | (2-5) | 10% |
| V2-HHB-1 | (2-5) | 9% |
| 2-BB(F)B-3 | (2-7) | 4% |

NI = 92.3° C.; Tc < −30° C.; Δn = 0.096; Δε = 4.8; Vth = 2.15 V; η = 15.7 mPa · s; flicker rate = 0.51%.

Example 7

| | | |
|---|---|---|
| 3-GB(F, F)XB(F, F)-F | (1-10) | 8% |
| 3-BB(F, F)XB(F, F)-F | (1-13) | 5% |
| 3-BB(F, F)XB(F)-OCF3 | (1-13) | 5% |
| 3-HBBXB(F, F)-F | (1-16) | 6% |
| 3-HBB(F, F)XB(F, F)-F | (1-16) | 7% |
| 3-HH-V | (2-1) | 10% |
| 4-HH-V | (2-1) | 10% |
| F3-HH-V | (2-1) | 11% |
| 3-HHB-3 | (2-5) | 4% |
| V-HHB-1 | (2-5) | 7% |
| V2-HHB-1 | (2-5) | 7% |
| V2-BB(F)B-1 | (2-7) | 3% |
| 2-BB(2F, 3F)B-3 | (3-9) | 12% |
| 3-HBB(2F, 3F)-O2 | (3-13) | 5% |

NI = 86.4° C.; Tc < −30° C.; Δn = 0.121; Δε = 5.6; Vth = 1.83 V; η = 14.0 mPa · s; flicker rate = 0.77%.

Example 8

| | | |
|---|---|---|
| 3-HHXB(F, F)-F | (1-4) | 9% |
| 3-BB(F, F)XB(F, F)-F | (1-13) | 16% |
| 3-dhBB(F, F)XB(F, F)-F | (1-18) | 8% |
| 3-BB(F)B(F, F)XB(F, F)-F | (1-19) | 5% |
| 3-HH-V | (2-1) | 22% |
| 3-HH-V1 | (2-1) | 10% |
| V-HHB-1 | (2-5) | 13% |
| V2-HHB-1 | (2-5) | 12% |
| 3-HBB-2 | (2-6) | 5% |

NI = 86.0° C.; Tc < −30° C.; Δn = 0.099; Δε = 7.5; Vth = 1.61 V; η = 12.8 mPa · s; flicker rate = 0.48%.

Example 9

| | | |
|---|---|---|
| 3-BB(F)B(F, F)-F | (1-12) | 6% |
| 3-BB(F)B(F, F)-CF3 | (1-12) | 3% |
| 3-BB(F, F)XB(F, F)-F | (1-13) | 4% |
| 3-HBBXB(F, F)-F | (1-16) | 5% |
| 4-GB(F)B(F, F)XB(F, F)-F | (1-17) | 4% |
| 4-BB(F)B(F, F)XB(F, F)-F | (1-19) | 9% |
| 3-HH-V | (2-1) | 30% |
| 3-HH-V1 | (2-1) | 6% |
| 3-HH-VFF | (2-1) | 8% |
| V-HHB-1 | (2-5) | 5% |
| 1-BB(F)B-2V | (2-7) | 4% |
| 2-BB(F)B-2V | (2-7) | 4% |
| 3-HB(2F, 3F)-O2 | (3-1) | 3% |
| 3-BB(2F, 3F)-O2 | (3-4) | 3% |
| 3-HHB(2F, 3F)-O2 | (3-6) | 3% |
| 3-dhBB(2F, 3F)-O2 | (3-14) | 3% |

NI = 78.0° C.; Tc < −30° C.; Δn = 0.114; Δε = 5.7; Vth = 1.81 V; η = 14.4 mPa · s; flicker rate = 0.39%.

Example 10

| | | |
|---|---|---|
| 3-HHB-CL | (1-2) | 3% |
| 3-HGB(F, F)-F | (1-5) | 6% |
| 4-GB(F)B(F, F)XB(F, F)-F | (1-17) | 3% |
| 3-BB(F)B(F, F)XB(F, F)-F | (1-19) | 2% |
| 4-BB(F)B(F, F)XB(F, F)-F | (1-19) | 5% |
| 5-BB(F)B(F, F)XB(F, F)-F | (1-19) | 6% |
| 3-HH-V | (2-1) | 30% |
| 2-HH-3 | (2-1) | 7% |
| V-HHB-1 | (2-5) | 12% |
| V2-HHB-1 | (2-5) | 11% |
| 5-HBB(F)B-2 | (2-13) | 10% |
| 5-HBB(F)B-3 | (2-13) | 5% |

NI = 117.5° C.; Tc < −30° C.; Δn = 0.120; Δε = 4.3; Vth = 2.41 V; η = 14.2 mPa · s; flicker rate = 0.25%.

Example 11

| | | |
|---|---|---|
| 3-BB(F)B(F, F)-F | (1-12) | 21% |
| 3-BB(F)B(F, F)XB(F, F)-F | (1-19) | 2% |
| 3-HB-CL | (1) | 5% |
| 3-HH-V | (2-1) | 25% |
| V2-BB-1 | (2-3) | 5% |
| 1V2-BB-1 | (2-3) | 5% |
| 1-BB-3 | (2-3) | 5% |
| 1-BB(F)B-2V | (2-7) | 8% |
| 2-BB(F)B-2V | (2-7) | 8% |
| 3-BB(F)B-2V | (2-7) | 8% |

-continued

| | | |
|---|---|---|
| 5-B(F)BB-2 | (2-8) | 4% |
| 5-HBBH-1O1 | (—) | 4% |

NI = 75.8° C.; Tc < –10° C.; Δn = 0.168; Δε = 3.8; Vth = 2.45 V; η = 25.1 mPa·s; flicker rate = 0.13%.

Example 12

| | | |
|---|---|---|
| 3-HHB(F)-F | (1-2) | 3% |
| 3-HHXB(F, F)-F | (1-4) | 2% |
| 3-HBB(F)-F | (1-7) | 3% |
| 3-GB(F)B(F)-F | (1-9) | 8% |
| 3-BB(2F, 3F)XB(F, F)-F | (1-13) | 9% |
| 4-GB(F)B(F)B(F)-F | (1-15) | 3% |
| 3-GBB(F)B(F, F)-F | (1-15) | 2% |
| 3-HH-V | (2-1) | 30% |
| F3-HH-V | (2-1) | 10% |
| V-HHB-1 | (2-5) | 9% |
| 1-BB(F)B-2V | (2-7) | 4% |
| 2-BB(F)B-2V | (2-7) | 6% |
| 3-BB(F)B-2V | (2-7) | 5% |
| 5-HBBH-3 | (2-11) | 3% |
| 3-dhBB(2F, 3F)-O2 | (3-14) | 3% |

NI = 87.2° C.; Tc < –30° C.; Δn = 0.120; Δε = 3.1; Vth = 2.44 V; η = 16.5 mPa·s; flicker rate = 0.23%.

Example 13

| | | |
|---|---|---|
| 5-HXB(F, F)-F | (1-1) | 3% |
| 3-HHXB(F, F)-OCF3 | (1-4) | 7% |
| 4-BB(F)B(F, F)XB(F, F)-F | (1-19) | 9% |
| 3-BB(F)B(F, F)XB(F)B(F, F)-F | (1-21) | 3% |
| 3-HH2B(F, F)-F | (1) | 4% |
| 3-HH-V | (2-1) | 41% |
| 3-HHB-1 | (2-5) | 3% |
| V-HHB-1 | (2-5) | 10% |
| V2-HHB-1 | (2-5) | 10% |
| 2-BB(F)B-2V | (2-7) | 3% |
| 3-BB(F)B-2V | (2-7) | 3% |
| 3-HB(F)HH-5 | (2-9) | 4% |

NI = 106.1° C.; Tc < –30° C.; Δn = 0.105; Δε = 3.2; Vth = 2.49 V; η = 11.8 mPa·s; flicker rate = 0.68%.

Example 14

| | | |
|---|---|---|
| 3-HBEB(F, F)-F | (1-8) | 5% |
| 3-dhB(F, F)XB(F, F)-F | (1-11) | 8% |
| 3-HBB-F | (1-7) | 3% |
| 3-HBBXB(F, F)-F | (1-16) | 10% |
| 3-BB(F)B(F, F)XB(F, F)-F | (1-19) | 2% |
| 4-BB(F)B(F, F)XB(F, F)-F | (1-19) | 7% |
| 3-HH-V | (2-1) | 36% |
| 3-HH-V1 | (2-1) | 9% |
| 3-HH-O1 | (2-1) | 5% |
| 3-HHB-1 | (2-5) | 4% |
| V-HHB-1 | (2-5) | 7% |
| 3-HB(F)BH-3 | (2-12) | 4% |

NI = 86.5° C.; Tc < –30° C.; Δn = 0.095; Δε = 5.4; Vth = 1.79 V; η = 12.8 mPa·s; flicker rate = 0.39%.

Example 15

| | | |
|---|---|---|
| 3-GB(F)B(F)-F | (1-9) | 5% |
| 3-BB(F, F)XB(F, F)-F | (1-13) | 12% |
| 4-GBB(F, F)XB(F, F)-F | (1-17) | 4% |
| 4-GB(F)B(F, F)XB(F, F)-F | (1-17) | 6% |
| 4-BB(F)B(F, F)XB(F, F)-F | (1-19) | 4% |
| 3-HH-V | (2-1) | 35% |
| 3-HH-V1 | (2-1) | 5% |
| V-HHB-1 | (2-5) | 10% |
| V2-HHB-1 | (2-5) | 10% |
| V-HBB-2 | (2-6) | 6% |
| 2-BB(F)B-2V | (2-7) | 3% |

NI = 83.2° C.; Tc < –25° C.; Δn = 0.103; Δε = 6.7; Vth = 1.70 V; η = 12.8 mPa·s; flicker rate = 0.08%.

Example 16

| | | |
|---|---|---|
| 3-GB(F)B(F)-F | (1-9) | 7% |
| 3-GB(F, F)XB(F, F)-F | (1-10) | 5% |
| 3-BB(F)B(F, F)-F | (1-12) | 12% |
| 4-GBB(F, F)XB(F, F)-F | (1-17) | 4% |
| 5-GBB(F, F)XB(F, F)-F | (1-17) | 4% |
| 3-HH-V | (2-1) | 32% |
| 3-HH-V1 | (2-1) | 5% |
| V-HHB-1 | (2-5) | 12% |
| V2-HHB-1 | (2-5) | 13% |
| 1-BB(F)B-2V | (2-7) | 3% |
| 2-BB(F)B-2V | (2-7) | 3% |

NI = 86.1° C.; Tc < –30° C.; Δn = 0.111; Δε = 7.1; Vth = 1.63 V; η = 13.5 mPa·s; flicker rate = 0.11%.

In the liquid crystal display device including the composition described in Example 1 to Example 16, the flicker rate was in the range of 0.03% to 0.91%. In contrast, the flicker rate of the device including the composition in Comparative Example 1 was 1.66%. The flicker rate in Examples fell into the range of 0% to 1% in this manner. It is thus concluded that the liquid crystal display device of the invention has excellent characteristics.

INDUSTRIAL APPLICABILITY

The liquid crystal display device of the invention has characteristics such as a short response time, a large voltage holding ratio, a low threshold voltage, a large contrast ratio, a long service life and a small flicker rate, and the flicker rate is in the range of 0% to 1%. Thus, this device can be used for a liquid crystal projector, a liquid crystal television and so forth.

What is claimed is:

1. A liquid crystal display device comprising a first substrate, a second substrate and a liquid crystal composition having a nematic phase and having positive dielectric anisotropy, which is placed between these substrates and comprises at least one compound selected from compounds represented by formula (1) as a first component, and at least one compound selected from compounds represented by formula (2) as a second component, wherein a flicker rate is in the range of 0% to 1%,

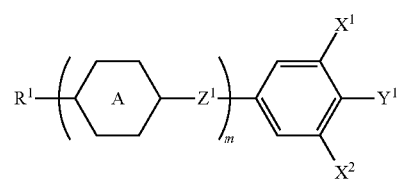

(1)

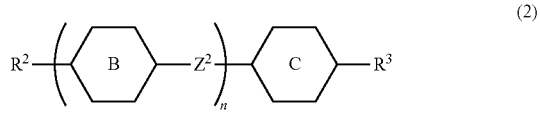

(2)

in formula (1), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyrimidine-2,5-diyl, 1,3-dioxane-2,5-diyl, tetrahydropyran-2,5-diyl or naphthalene-2,6-diyl; $Z^1$ is a single bond, ethylene, vinylene, methyleneoxy, carbonyloxy or difluoromethyleneoxy; $X^1$ and $X^2$ are independently hydrogen or fluorine; $Y^1$ is fluorine, chlorine, alkyl having 1 to 12 carbons in which at least one hydrogen has been replaced by halogen, alkoxy having 1 to 12 carbons in which at least one hydrogen has been replaced by halogen or alkenyloxy having 2 to 12 carbons in which at least one hydrogen has been replaced by halogen; m is 0, 1, 2, 3 or 4, and in formula (2), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; n is 1, 2 or 3.

2. The liquid crystal display device according to claim 1, wherein the first component of the liquid crystal composition is at least one compound selected from the group of compounds represented by formula (1-1) to formula (1-21):

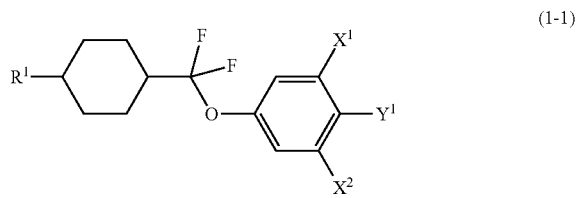

(1-1)

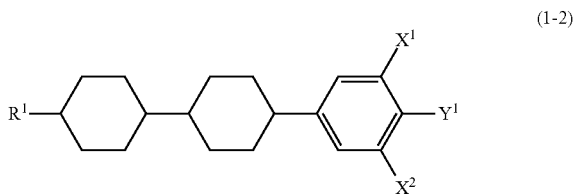

(1-2)

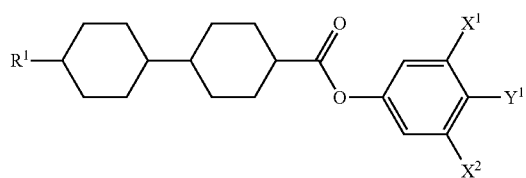

(1-3)

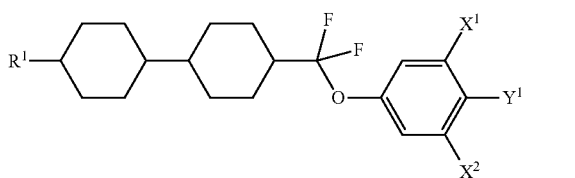

(1-4)

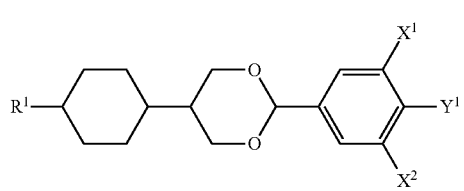

(1-5)

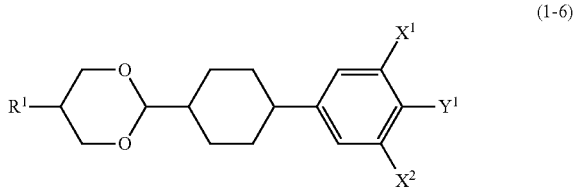

(1-6)

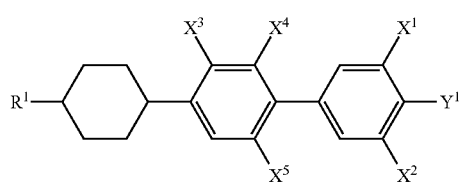

(1-7)

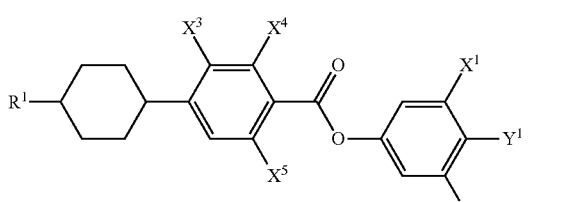

(1-8)

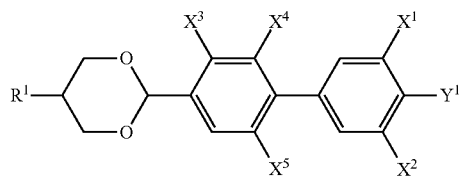

(1-9)

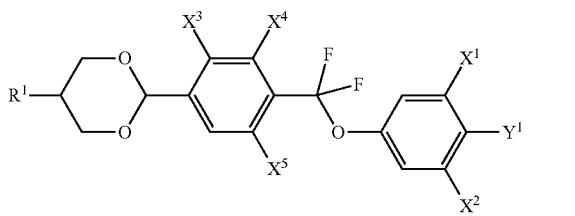

(1-10)

-continued (1-11) 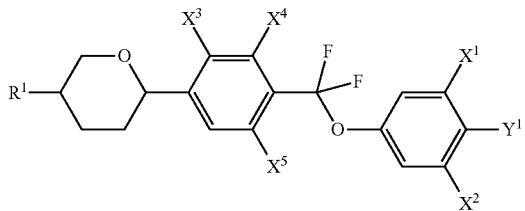

(1-12) 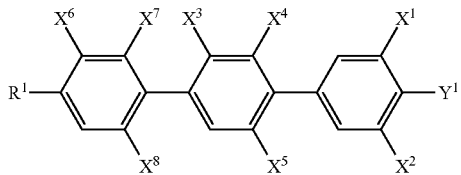

(1-13) 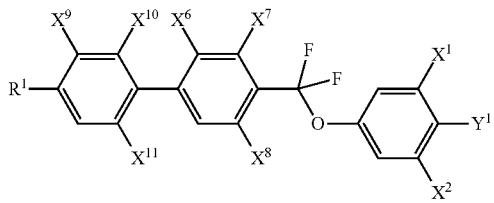

(1-14) 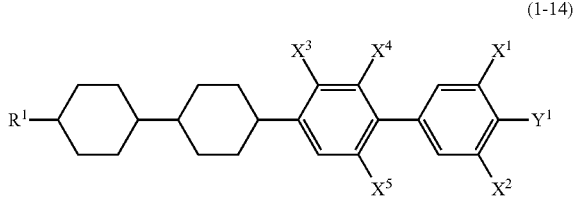

(1-15) 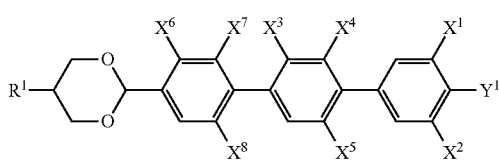

(1-16) 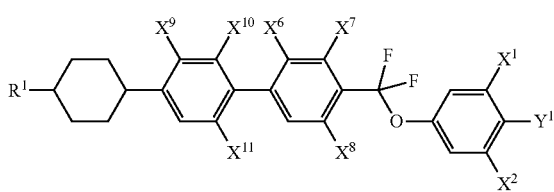

(1-17) 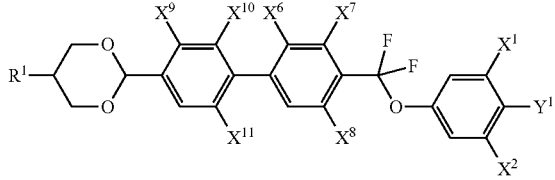

(1-18) 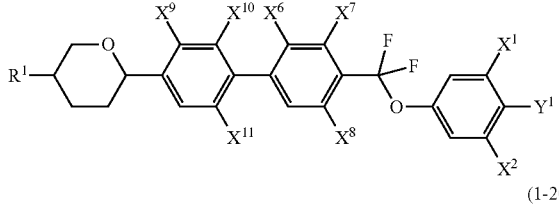

(1-19) 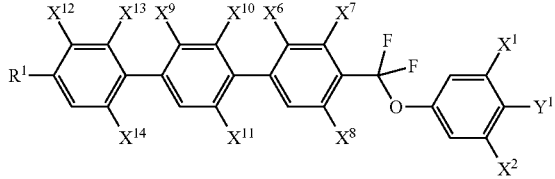

(1-20) 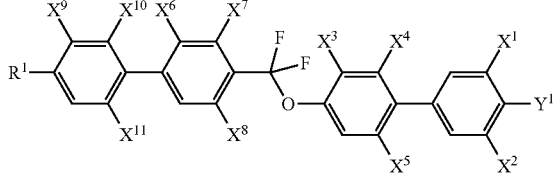

(1-21)

in formula (1-1) to formula (1-21), $R^1$ is alkyl having 1 to 12 carbons, alkoxy having 1 to 12 carbons or alkenyl having 2 to 12 carbons; $X^1$ to $X^{14}$ are independently hydrogen or fluorine; $Y^1$ is fluorine, chlorine, alkyl having 1 to 12 carbons in which at least one hydrogen has been replaced by halogen or alkoxy having 1 to 12 carbons in which at least one hydrogen has been replaced by halogen.

3. The liquid crystal display device according to claim 1, wherein the proportion of the first component of the liquid crystal composition is in the range of 15% by weight to 60% by weight based on the weight of the liquid crystal composition.

4. The liquid crystal display device according to claim 1, wherein the second component of the liquid crystal composition is at least one compound selected from the group of compounds represented by formula (2-1) to formula (2-13):

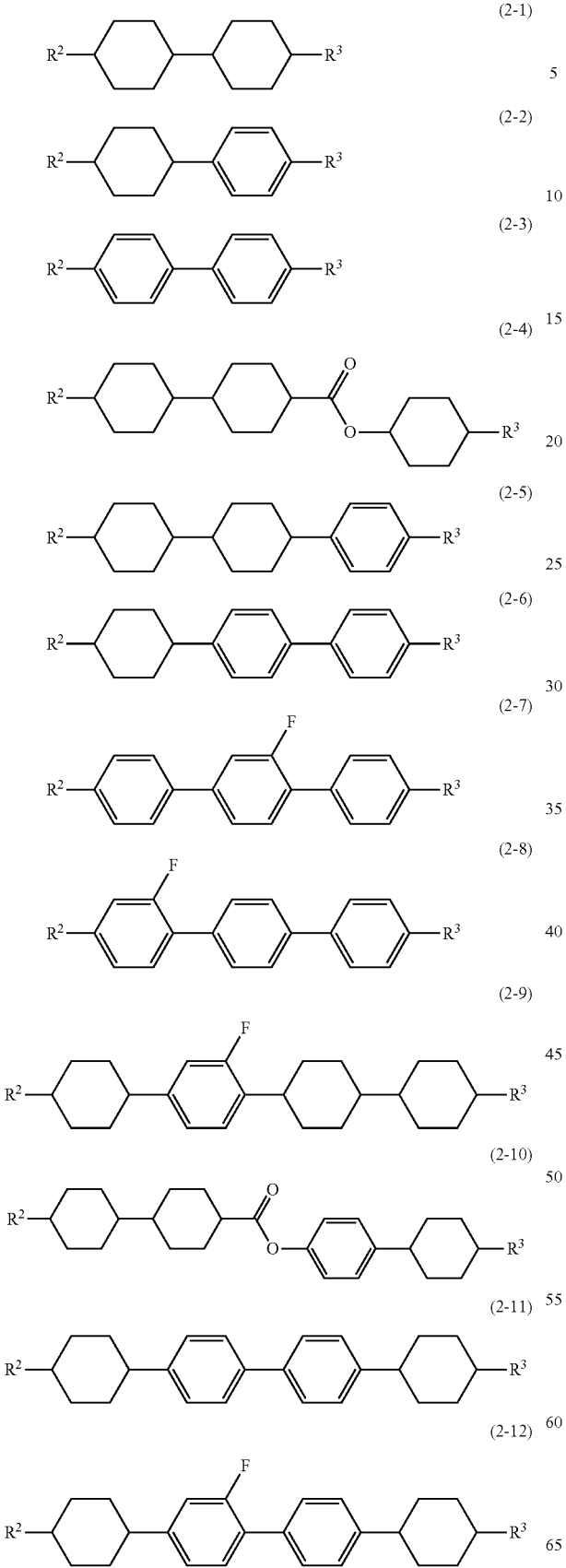

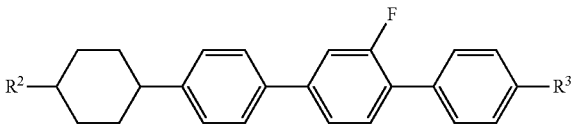

in formula (2-1) to formula (2-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen.

5. The liquid crystal display device according to claim 1, wherein the proportion of the second component of the liquid crystal composition is in the range of 40% by weight to 80% by weight based on the weight of the liquid crystal composition.

6. The liquid crystal display device according to claim 1, wherein the liquid crystal composition comprises at least one compound selected from the group of compounds represented by formula (3) as a third component:

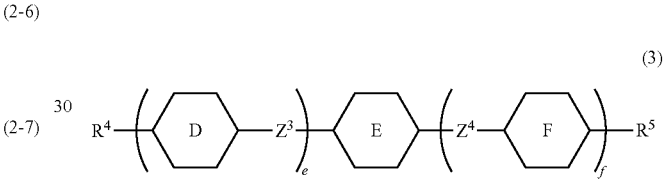

in formula (3), $R^4$ and $R^5$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen; ring D and ring F are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; e is 1, 2 or 3, f is 0 or 1; and the sum of e and f is 3 or less.

7. The liquid crystal display device according to claim 6, wherein the third component of the liquid crystal composition is at least one compound selected from the group of compounds represented by formula (3-1) to formula (3-19):

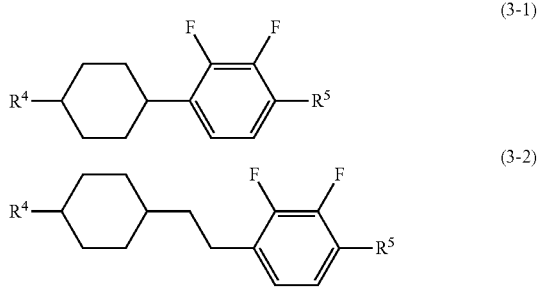

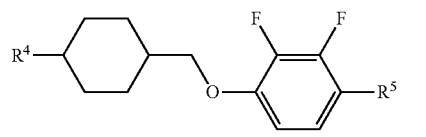
(3-3)

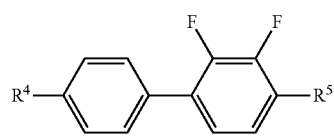
(3-4)

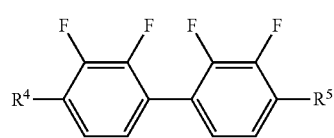
(3-5)

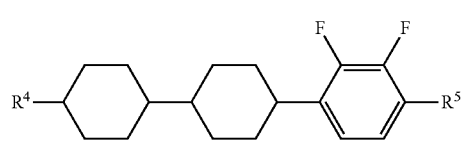
(3-6)

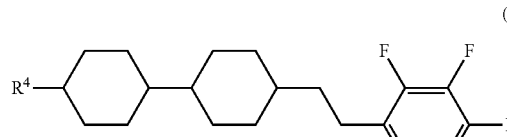
(3-7)

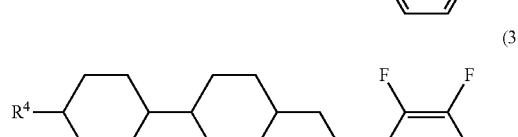
(3-8)

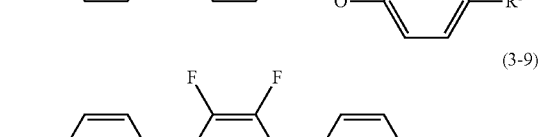
(3-9)

(3-10)

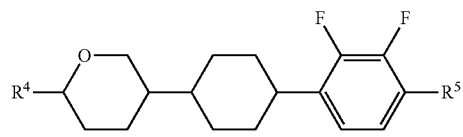
(3-11)

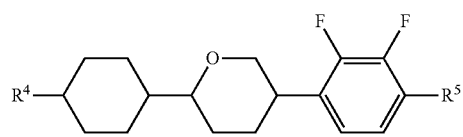
(3-12)

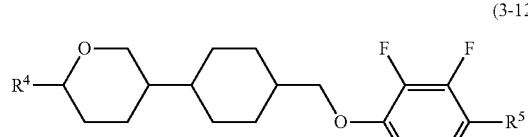
(3-13)

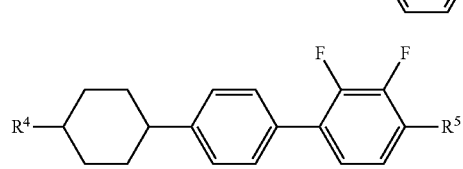

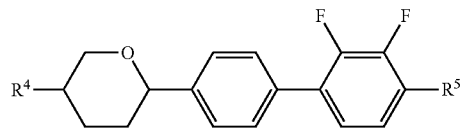
(3-14)

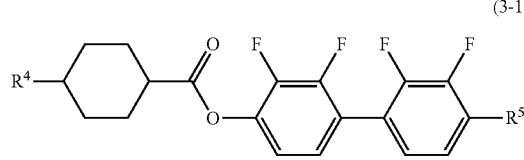
(3-15)

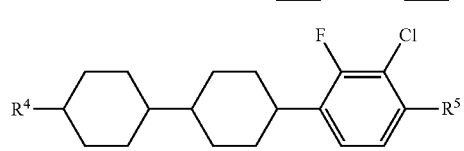
(3-16)

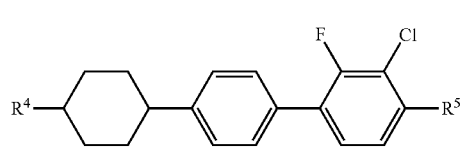
(3-17)

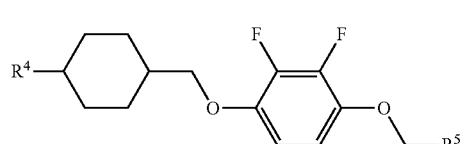
(3-18)

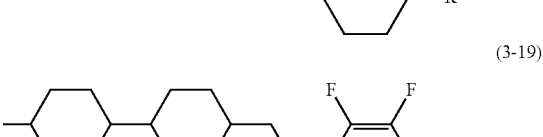
(3-19)

in formula (3-1) to formula (3-19), $R^4$ and $R^5$ are independently alkyl having 1 to 12 carbons, alkoxy having 1 to 12 carbons, alkenyl having 2 to 1.2 carbons, alkenyloxy having 2 to 12 carbons or alkyl having 1 to 12 carbons in which at least one hydrogen has been replaced by halogen.

8. The liquid crystal display device according to claim 6, wherein the proportion of the third component of the liquid crystal composition is in the range of 3% by weight to 20% by weight based on the weight of the liquid crystal composition.

9. The liquid crystal display device according to claim 1, wherein in the liquid crystal composition, the maximum temperature of a nematic phase is 70° C. or higher, the optical anisotropy (measured at 25° C.) at a wavelength of 589 nanometers is 0.07 or more, and the dielectric anisotropy (measured at 25° C.) at a frequency of 1 kHz is 2 or more.

10. The liquid crystal display device according to claim 1, wherein an operating mode of the liquid crystal display device is a TN mode, an ECB mode, an OCB mode, an IPS mode, an FFS mode or an FPA mode and a driving mode of the liquid crystal display device is an active matrix mode.

11. The liquid crystal display device according to claim 1, wherein an operating mode of the liquid crystal display device is an IPS mode or FFS mode, and a driving mode of the liquid crystal display device is an active matrix mode.

12. A liquid crystal composition comprised in a liquid crystal display device according to claim 1.

\* \* \* \* \*